(12) United States Patent
Tsuzaki et al.

(10) Patent No.: US 9,176,625 B2
(45) Date of Patent: Nov. 3, 2015

(54) INFORMATION INPUT DEVICE, INFORMATION INPUT METHOD, INFORMATION INPUT-OUTPUT DEVICE, STORAGE MEDIUM, AND ELECTRONIC UNIT

(71) Applicant: Japan Display Inc., Tokyo (JP)

(72) Inventors: Ryoichi Tsuzaki, Kanagawa (JP); Kazunori Yamaguchi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 126 days.

(21) Appl. No.: 13/927,561

(22) Filed: Jun. 26, 2013

(65) Prior Publication Data

US 2013/0285988 A1    Oct. 31, 2013

Related U.S. Application Data

(63) Continuation of application No. 12/781,964, filed on May 18, 2010, now Pat. No. 8,482,538.

(30) Foreign Application Priority Data

May 26, 2009 (JP) .................................. 2009-126488

(51) Int. Cl.
G06F 3/041    (2006.01)
G06F 3/044    (2006.01)

(52) U.S. Cl.
CPC .............. *G06F 3/0418* (2013.01); *G06F 3/044* (2013.01)

(58) Field of Classification Search
CPC ...................................................... G06F 3/0418
USPC ........................... 345/173–178; 715/863–866
See application file for complete search history.

(56) References Cited

U.S. PATENT DOCUMENTS

| | | | |
|---|---|---|---|
| 8,482,538 | B2 | 7/2013 | Tsuzaki et al. |
| 2006/0026535 | A1 | 2/2006 | Hotelling et al. |
| 2008/0136754 | A1 | 6/2008 | Tsuzaki et al. |
| 2008/0246722 | A1 | 10/2008 | Tsuzaki et al. |
| 2010/0302203 | A1 | 12/2010 | Tsuzaki et al. |

FOREIGN PATENT DOCUMENTS

| | | |
|---|---|---|
| GB | 2 439 554 A | 1/2008 |
| JP | 2000-066837 A | 3/2000 |
| JP | 2000-357046 A | 12/2000 |
| JP | 2008-097172 A | 4/2008 |
| JP | 2008-146165 | 6/2008 |
| JP | 2008-299474 A | 12/2008 |
| JP | 2009-048335 A | 3/2009 |
| TW | 200630850 A | 9/2006 |
| TW | 200844809 A | 11/2008 |

*Primary Examiner* — Dennis Joseph
(74) *Attorney, Agent, or Firm* — Wolf, Greenfield & Sacks, P.C.

(57) ABSTRACT

An information input device includes an input panel and one or more circuits. The one or more circuits are configured to determine first, second and third representations of possible proximity of an object to an input panel from first, second and third input frames, respectively. The second input frame is generated after the first input frame, and the third input frame is generated after the second input frame. The one or more circuits are configured to determine whether proximity of the object to the input panel is detected for the second input frame, based on the third representation, if the first and second representations are not similar.

35 Claims, 17 Drawing Sheets

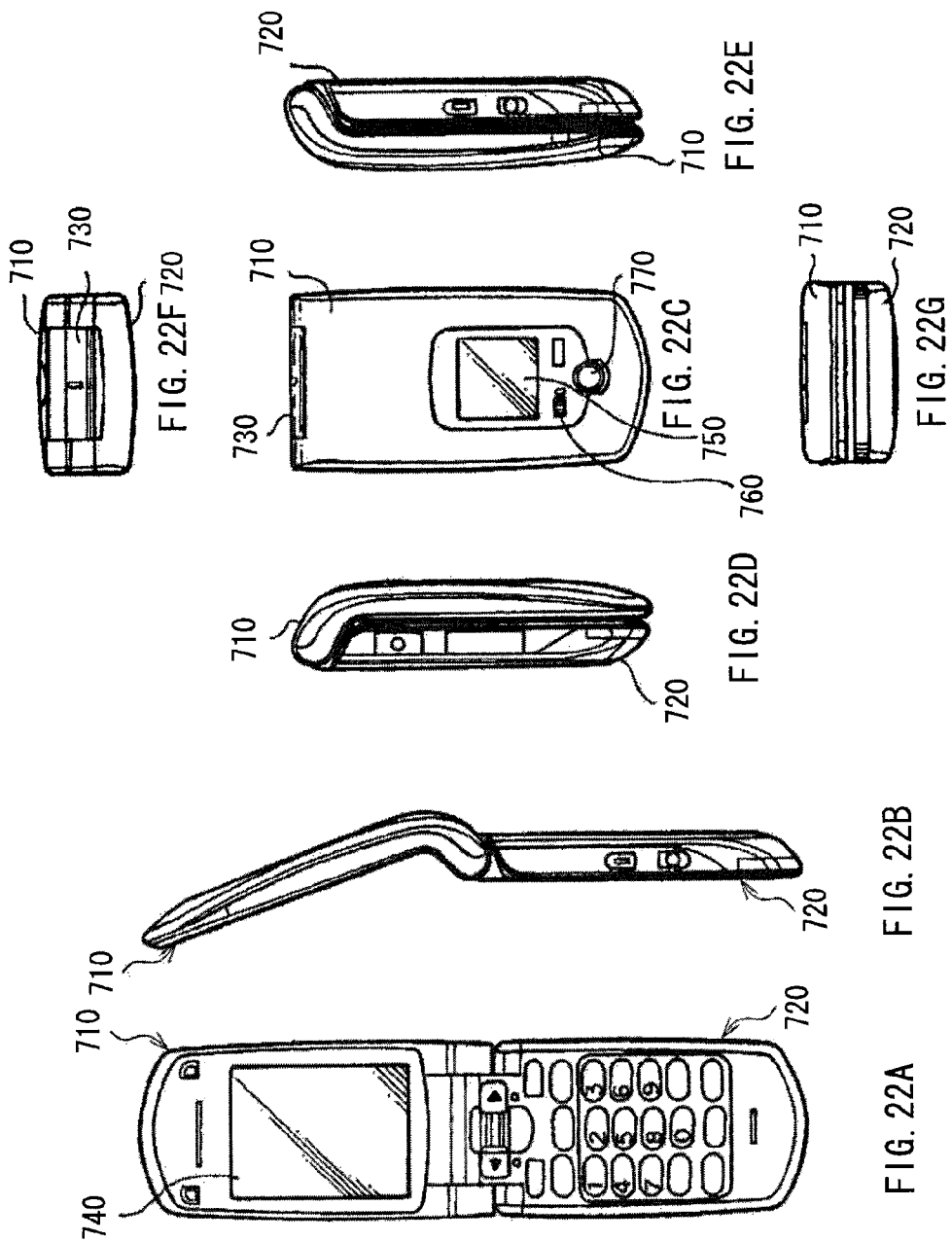

INFORMATION INPUT DEVICE, INFORMATION INPUT METHOD, INFORMATION INPUT-OUTPUT DEVICE, STORAGE MEDIUM, AND ELECTRONIC UNIT

CROSS REFERENCE TO RELATED APPLICATIONS

This application is a continuation of U.S. application Ser. No. 12/781,964, entitled "Information Input Device, Information Input Method, Information Input-Output Device, Storage Medium, and Electronic Unit" and filed on May 18, 2010, which is incorporated herein by reference in its entirety. U.S. application Ser. No. 12/781,964 claims priority to Japanese Patent Application No. 2009-126488, filed in the Japanese Patent Office on May 26, 2009, the entire contents of which are incorporated herein by reference.

BACKGROUND OF THE INVENTION

1. Field of the Invention

The present invention relates to an information input device, an information input method, an information input-output device, a storage medium, and an electronic unit for inputting information on an external proximity object.

2. Description of the Related Art

Some image display devices include a touch panel. Types of touch panels include a contact type touch panel detecting a contact position of electrodes, a capacitive touch panel using a change in capacitance, and an optical touch panel optically detecting a finger or the like.

In an optical touch panel, for example, light from a backlight is modulated with a liquid crystal device to display an image on a display plane, and light is emitted from a display plane to be reflected by an external proximity object such as a finger, so that a light receiving device disposed on the display plane receives the reflected light to detect a position or the like of the external proximity object. Japanese Unexamined Patent Application Publication No. 2008-146165 discloses such an image display device, for example. The disclosed image display device includes a display having a display unit for displaying an image and an image-pickup unit for picking up an image of an object.

SUMMARY OF THE INVENTION

In the above-described touch panel, in cases where information about a position or the like of an external proximity object is obtained (input), it is desired to be able to remove (reduce) noise wherever possible to surely input the information. However, even though a circuit or the like for removing (reducing) such noise is provided, or the noise is removed (reduced) by image processing with software, the noise sometimes is not removed effectively due to status of use depending on surrounding environment. Also, in cases where the loss or the like of information is caused for a certain period due to any reason depending on status of use, it has been difficult for the related art to surely input information, sufficiently.

It is desirable to provide an information input device, an information input method, an information input-output device, a storage medium, and an electronic unit with which it is possible to surely input information on an external proximity object regardless of status of use.

One embodiment according to the present disclosure is directed to apparatus for detecting proximity of an object, the apparatus comprising an input panel comprising at least one detection element, and at least one circuit configured to determine, from a first input frame, a first representation of possible proximity of the object to the input panel; determine, from a second input frame generated after the first input frame, a second representation of possible proximity of the object to the input panel; determine, from a third input frame generated after the second input frame, a third representation of possible proximity of the object to the input panel; and determine whether proximity of the object to the input panel is detected for the second input frame, based at least in part on the third representation, if the first and second representations are not similar.

Another embodiment is directed to a method for detecting proximity of an object to an input panel, the method comprising determining, from a first input frame, a first representation of possible proximity of the object to the input panel; determining, from a second input frame generated after the first input frame, a second representation of possible proximity of the object to the input panel; determining, from a third input frame generated after the second input frame, a third representation of possible proximity of the object to the input panel; and determining, using at least one circuit, whether proximity of the object to the input panel is detected for the second input frame, based at least in part on the third representation, if the first and second representations are not similar.

Another embodiment is directed to at least one non-transitory computer-readable storage medium encoded with a plurality of computer-executable instructions that, when executed, perform a method for detecting proximity of an object to an input panel, the method comprising determining, from a first input frame, a first representation of possible proximity of the object to the input panel; determining, from a second input frame generated after the first input frame, a second representation of possible proximity of the object to the input panel; determining, from a third input frame generated after the second input frame, a third representation of possible proximity of the object to the input panel; and determining whether proximity of the object to the input panel is detected for the second input frame, based at least in part on the third representation, if the first and second representations are not similar.

According to some embodiments of the invention, it becomes possible to more appropriately perform processing with respect to one or more detections of possible proximity of an object (e.g., an external proximity object) to an input panel (e.g., a touch panel) within an input frame (e.g., intra-frame processing), and/or across multiple input frames (e.g., inter-frame processing), even when an isolating detection dots-block is generated due to noise between frames and/or loss of information between frames, for example. Therefore, it is possible to surely input information on the external proximity object, regardless of status of use.

BRIEF DESCRIPTION OF THE DRAWINGS

FIG. 22A is an elevation view of a fifth application example in an opened state.

FIG. 22B is a side view of the fifth application example in the opened state.

FIG. 22C is an elevation view of the fifth application example in a closed state.

FIG. 22D is a left side view of the fifth application example in the closed state.

FIG. 22E is a right side view of the fifth application example in the closed state.

FIG. 22F is a top view of the fifth application example in the closed state.

FIG. 22G is a bottom view of the fifth application example in the closed state.

DETAILED DESCRIPTION OF THE PREFERRED EMBODIMENTS

Embodiments of the invention will be described in detail with reference to the appended drawings hereinafter. The description will be in the following order.
I. Embodiments (information input process by inter-frame processing and intra-frame noise processing)
II. Modifications (examples of other configurations of an information input-output device and an input-output panel)
III. Application examples (examples of application to an electronic unit)

I. Embodiment

[The General Configuration of an Information Input-output Device 1]

Figure 1:
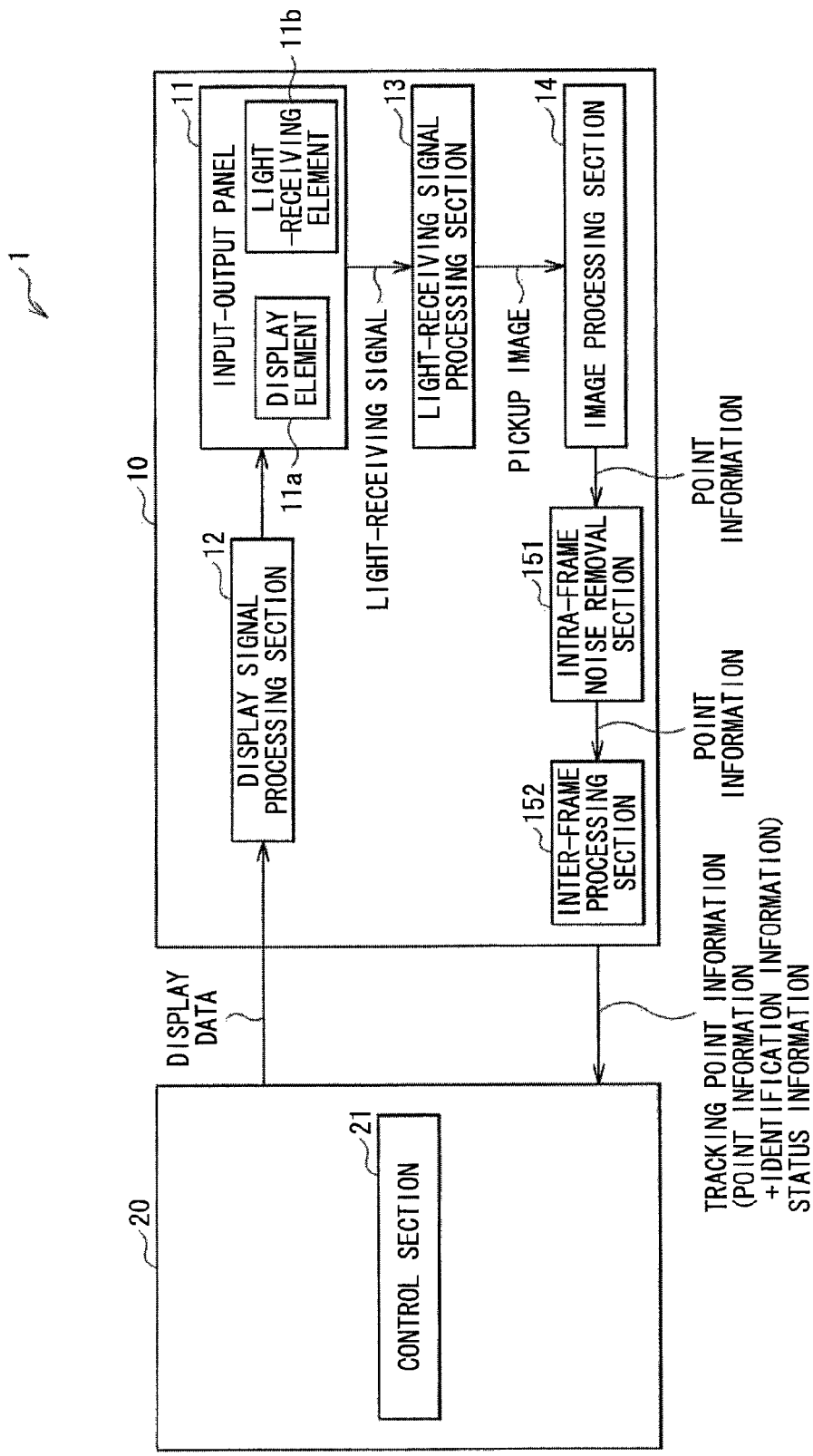
FIG. 1 is a block diagram illustrating the configuration of an information input-output device according to an embodiment of the invention.
Figure 2:
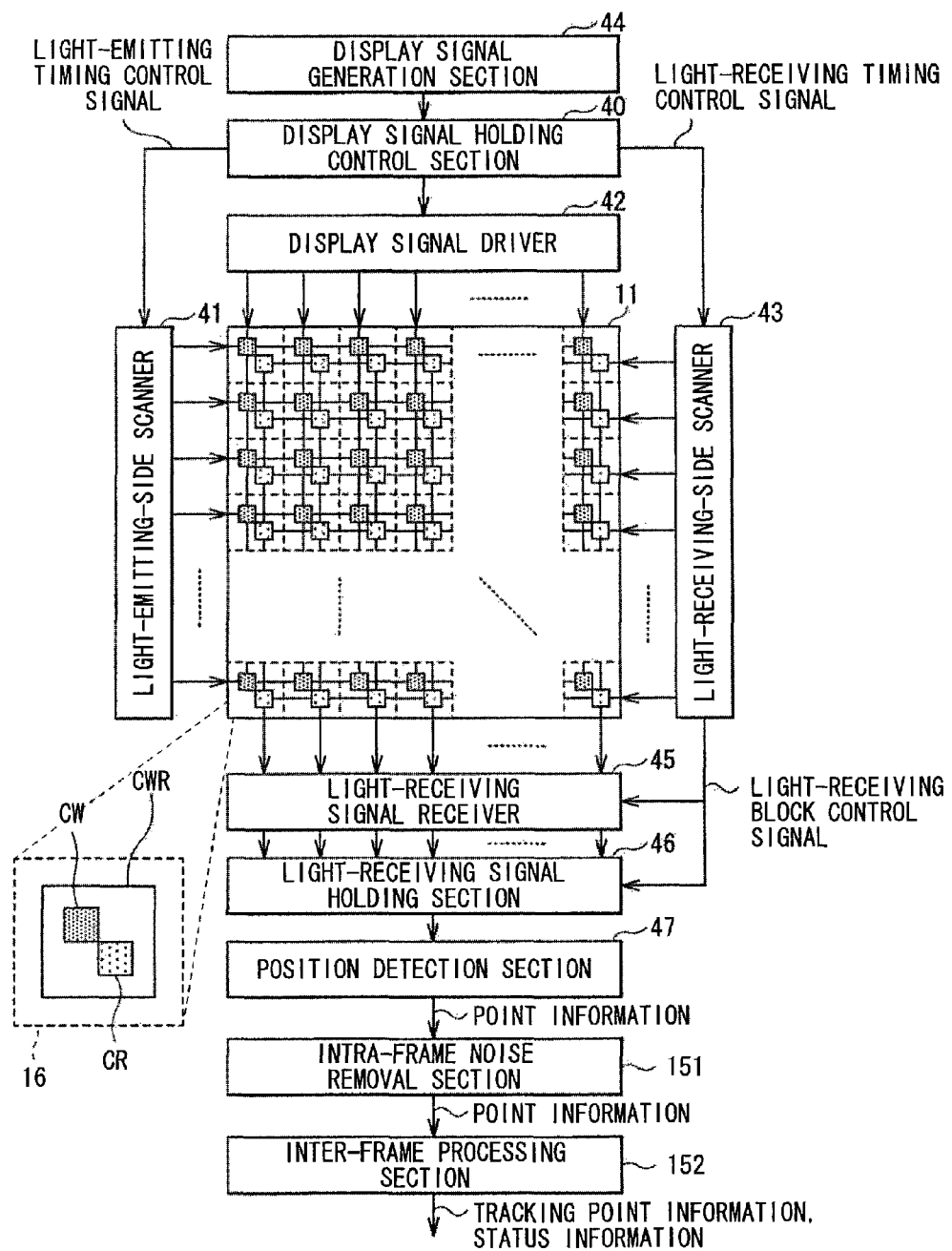
FIG. 2 is a block diagram illustrating the configuration of the information input-output device shown in FIG. 1 in detail.
Figure 3:
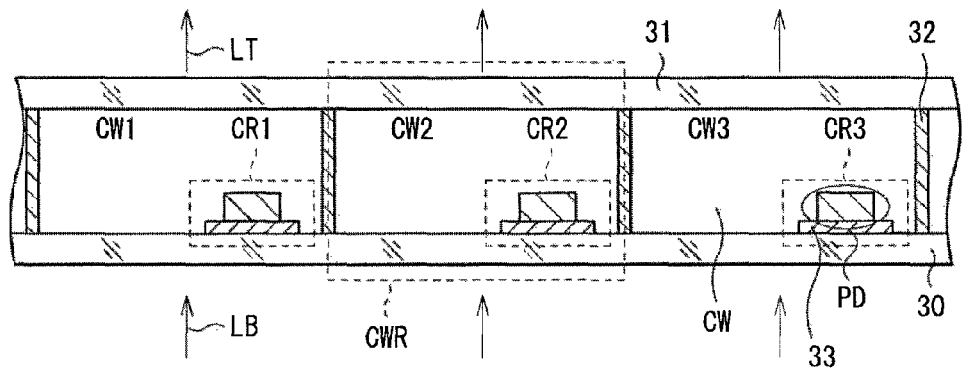
FIG. 3 is a cross sectional view in which an input-output panel is partially enlarged.

FIG. 1 schematically illustrates the configuration of an information input-output device 1 according to an embodiment of the invention. FIG. 2 illustrates the configuration of the information input-output device 1 in detail. FIG. 3 illustrates a cross section of an input-output panel which is partially enlarged. With reference to FIG. 1, the information input-output device 1 includes a display 10 and an electronic unit body 20 using the display 10. The display 10 includes an input-output panel 11, a display signal processing section 12, a light-receiving signal processing section 13, an image processing section 14, an intra-frame noise removal section 151, and an inter-frame processing section 152. The electronic unit body 20 includes a control section 21. Because an information input method and a storage medium according to an embodiment of the invention is embodied in the image input-output device 1 of the present embodiment, they will be described together hereinafter.

With reference to FIG. 2, the input-output panel 11 is configured with a liquid crystal display panel in which a plurality of pixels 16 is arranged in a matrix form. The input-output panel 11 includes a display element 11*a* and a light-receiving element 11*b*. The display element 11*a* is a liquid crystal device for displaying an image such as a graphic and a letter on a display plane by using light emitted from a back light as a light source. The light-receiving element 11*b* is a light-receiving device such as a photodiode device for receiving light to output a corresponding electric signal. Light is emitted from the back light, and then reflected by an external proximity object such as a finger (e.g., a human finger) outside the input-output panel 11, and then returned. Then, the light-receiving element 11*b* receives such reflected light to output a light-receiving signal (detection signal). In the case of the present embodiment, the light-receiving element 11*b* is disposed for each of the pixels 16, and thus a plurality of light-receiving elements 11*b* are disposed in a plane. The input-output panel 11 (or an input panel) and the light-receiving signal processing section 13 correspond to one illustrative example of an input-output panel section (or an input panel section) according to the present invention.

In the input-output panel 11, as shown in FIGS. 2 and 3, a plurality of light-emitting/light-receiving cells CWR, which are configured so as to be separated from one another by partitions 32, is arranged in a matrix form between a pair of transparent substrates 30 and 31. The individual light-emitting/light-receiving cells CWR include light emitting cells (CW1, CW2, CW3 . . . ) and include a plurality of light-receiving cells (CR1, CR2, CR3 . . . ) individually encapsulated in the individual light-emitting cells CW. A liquid crystal cell as the display element 11a configures the light-emitting cell CW. The light-receiving cell CR includes a light receiving device PD as the light-receiving element 11b. The light-receiving cell CR has a light shielding film 33 disposed between the transparent substrate 30 on a backlight side and light-receiving device PD so as to preclude the incidence of light LB emitted from the backlight. Consequently, each of the light-receiving devices PD is not affected by the light LB and detects only the light entering in a direction from the transparent substrate 31 on a side opposite to the backlight.

The display signal processing section 12 shown in FIG. 1 is a circuit which is connected in the prior stage of the input-output panel 11 and drives the input-output panel 11 so as to display an image on the basis of display data.

With reference to FIG. 2, the display signal processing section 12 includes a display signal holding control section 40, a light-emitting-side scanner 41, a display signal driver 42, and a light-receiving-side scanner 43. The display signal holding control section 40 stores a display signal output from a display signal generation section 44 in a field memory (or frame memory) configured by, for example, a static random access memory (SRAM) to hold the display signal for each screen (for each field display or each frame of display image). The display signal holding control section 40 also has a function for controlling a light-emitting-side scanner 41 and a display signal driver 42, both of which drive each of the light-emitting cells CW, and the light-receiving-side scanner 43 for driving each of the light-receiving cells CR, so as to operate them in conjunction with each other. Specifically, the display signal holding control section 40 outputs a light-emitting timing control signal to the light-emitting-side scanner 41, outputs a light-receiving timing control signal to the light-receiving scanner 43, and outputs a display signal for a single horizontal line to the display signal driver 42 on the basis of a control signal and a display signal stored in the field memory (or frame memory). By virtue of the control signals and the display signal, line sequential operation is performed.

The light-emitting-side scanner 41 has a function for selecting a light-emitting cell CW to be driven in accordance with the light-emitting timing control signal output from the display signal holding control section 40. Specifically, the light-emitting-side scanner 41 supplies a light-emitting selection signal though a light-emitting gate line connected to each of the pixels 16 of the input-output panel 11 to control a light-emitting device selection switch. Namely, in cases where a voltage, by which the light-emitting device selection switch of a certain pixel 16 is turned on, is applied by the light-emitting selection signal, the pixel 16 performs light-emitting operation in luminance corresponding to a voltage supplied from the display signal driver 42.

The display signal driver 42 has a function for supplying a light-emitting cell CW to be driven with display data in accordance with the display signal output from the display signal holding control section 40 for a single horizontal line. Specifically, the display signal driver 42 supplies the pixel 16 selected by the light-emitting-side scanner 41 with a voltage corresponding to the display data through a data supply line connected to each of the pixels 16 of the input-output panel 11. The light-emitting-side scanner 41 and the display signal driver 42 perform line sequential operation in conjunction with each other, so that an image corresponding to arbitrary display data is displayed on the input-output panel 11.

The light-receiving-side scanner 43 has a function for selecting a light-receiving cell CR to be driven in accordance with the light-receiving timing control signal output from the display signal holding control section 40. Specifically, the light-receiving-side scanner 43 supplies a light-receiving selection signal through a light-receiving gate line connected to each of the pixels 16 of the input-output panel 11 to control a light-receiving device selection switch. Namely, as in the case of the operation of the light-emitting-side scanner 41, in cases where a voltage, by which the light-receiving device selection switch of a certain pixel 16 is turned on, is applied by the light-receiving selection signal, a light-receiving signal detected from the pixel 16 is output to a light-receiving signal receiver 45. Consequently, for example, it is possible for the light-receiving cell CR to receive and detect light reflected by a contacting or approaching object on the basis of light emitted from a certain light-emitting cell CW. In addition, a light-receiving block control signal is output from the light-receiving-side scanner 43 to the light-receiving receiver 45 and a light-receiving signal holding section 46, so that the light-receiving-side scanner 43 also has a function for controlling a block contributing to such light-receiving operation. In the information input-output device 1 of the present embodiment, the light-emitting gate line and light-receiving gate line are separately connected to each of the light-receiving cells CWR, and the light-emitting-side scanner 41 and light-receiving-side scanner 43 are each allowed to be operated independently.

The light-receiving signal processing section 13 shown in FIG. 1 is connected in the post-stage of the input-output panel 11 and loads a light-receiving signal from the light-receiving element 11b to perform the amplification of the signal and filter processing. With reference to FIG. 2, the light-receiving signal processing section 13 includes the light-receiving signal receiver 45 and the light-receiving signal holding section 46.

The light-receiving signal receiver 45 has a function for obtaining a light-receiving signal for a single horizontal line, which is output from each of the light-receiving cells CR, in accordance with the light-receiving block control signal output from the light-receiving-side scanner 43. The light-receiving signal for a single horizontal line, which is obtained by the light-receiving signal receiver 45, is output to the light-receiving signal holding section 46.

The light-receiving signal holding section 46 has a function for reconfiguring the light-receiving signal output from the light-receiving receiver 45 into a light receiving signal for each screen (for each field or each frame of display image) in accordance with the light-receiving block control signal output from the light-receiving-side scanner 43. The light receiving signal for one screen, reconfigured by the light-receiving signal holding section 46, corresponds to a light receiving signal configuring one detection frame (or "input frame"). Consequently, such a light-receiving signal is stored in a field memory (or frame memory) configured by, for example, SRAM to be held therein. Data of the light-receiving signal stored by the light-receiving signal holding section 46 is output to a position detection section 47 in the image processing unit 14 (FIG. 1). The light-receiving signal holding section 46 may also be configured by a storage device other than a memory. For example, the light-receiving signal may be stored in a capacitance device as analog data (electric charges).

The image processing section 14 (FIG. 1) is a circuit which is connected in the post-stage of the light-receiving signal processing section 13, and which loads a pickup image from the light-receiving signal processing section 13 to perform processing such as binarization, noise removal, and labeling, and then obtains point information (i.e., detection information) of an external proximity object for each detection point (that is, detection region, i.e., "detection dots-block") of possible proximity of the external proximity object to the input panel. The point information, which will be described in detail hereinafter, includes position information showing the center of gravity and a central coordinate of a detection point (that is, detection region, i.e., "detection dots-block") of the external proximity object, density information showing density of the detection point, aspect ratio information showing an aspect ratio of the detection point, and/or area information of the detection point, for example.

The position detection section 47 (FIG. 2) in the image processing unit 14 specifies, for example, a position at which a detected object is positioned on the basis of the point information obtained by a labeling processing section (not shown) in the image processing section 14. Consequently, a position of a contacting or approaching finger or the like is allowed to be specified on a frame basis (e.g., for individual input frames). Thus, for each input frame, a representation of possible proximity of an object to the input panel may be determined. The representation may include an indication of whether possible proximity of the object to the input panel is determined for that input frame, and if so, an indication of the position of the detection of possible proximity of the object to the input panel.

In the intra-frame noise removal section 151, the point information output from the image processing section 14 is used to remove a detection point corresponding to intra-frame noise included in a frame of a pickup image. Specifically, the density information, the aspect ratio information, and/or the area information are used from among the point information to determine whether the performance of processing for a detection point (processing in the control section 21 described hereinafter) is valid or invalid for each of the detection points in accordance with the density, aspect ratio, and/or area of the detection point. Intra-frame noise processing in the intra-frame noise removal section 151 will be described in detail hereinafter.

The inter-frame processing section 152 determines a similarity in each detection point among a plurality of temporally sequential frames of a pickup image on the basis of the point information of each detection point. The similarity is a parameter comprehensively calculated from a distance, area, density, and/or aspect ratio in each detection point on the basis of position information, density information, aspect ratio information, and/or area information included in the point information. In the inter-frame processing section 152, detection points which are determined to have a high similarity are regarded as detection points corresponding to the same external proximity object, and then tracking processing described hereinafter is performed using individual identification information [identification data(ID)]. On the other hand, in the inter-frame processing section 152, the performance of processing for a detection point (processing in the control section 21 described hereinafter) is temporarily suspended with respect to a detection point for which it is determined among a plurality of frames that the detection point has a low similarity relative to any other detection points (i.e., the detection point with low similarity is an isolating detection point, or isolating detection dots-block). Then, processing for the isolating detection point is retrospectively performed in accordance with the result of the determination of a similarity in a subsequent frame. For example, if a representation of possible proximity of an object to the input panel from the current frame is not similar to a representation from a preceding frame, a determination of whether proximity of the object is in fact detected for the current frame may be made based on a representation from a subsequent frame. Tracking point information including the point information and the identification information, and status information described hereinafter are output from the inter-frame processing section 152 to the electronic unit body 20. The inter-frame processing (tracking processing, frame interpolation, and burst noise removal processing, or the like) in the inter-frame processing section 152 will be described in detail hereinafter.

The electronic unit body 20 (FIG. 1) outputs display data to the display signal processing section 12 of the display 10 and is input the tracking point information and the status information from the inter-frame processing section 152.

The control section 21 (FIG. 1) uses the tracking point information and the status information to change a display image, and is configured with a central processing unit (CPU) for example. The control section 21 includes the display signal generation section 44 as shown in FIG. 2. The display signal generation section 44 performs the following processing on the basis of image data which is generated and then supplied using a CPU or the like (not shown). Namely, a display signal is generated for displaying an image, for example, for each screen (for each field or each frame of display image) on the basis of such image data to output the display signal to the display signal holding control section 40.

[The Operation and Advantage of the Information Input-output Device 1]

The operation and advantage of the information input-output device 1 of the present embodiment will be described with reference to FIGS. 1 to 3 and FIGS. 4 to 14.

[1. Overview of Image Processing Operation]

Figure 4:
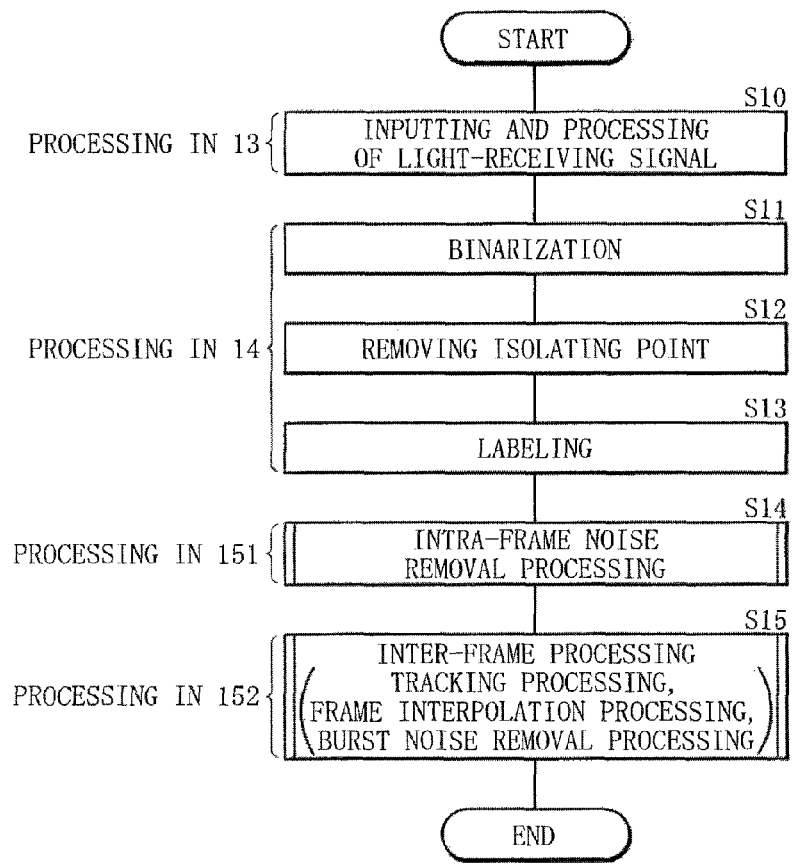
FIG. 4 is a flowchart illustrating an example of entire image processing performed by the information input-output device.

First, overview of image processing operation in the information input-output device 1 will be described with reference to FIG. 4. FIG. 4 is a flowchart illustrating entire image processing in the information input-output device 1.

The display data output from the electronic unit body 20 is input into the display signal processing section 12. The display signal processing section 12 drives the input-output panel 11 so as to display an image on the input-output panel 11 on the basis of display data.

The input-output panel 11 drives the light-receiving element 11b while displaying an image on the display element 11a using light emitted from a backlight. When an external proximity object such as a finger contacts or approaches the display element 11a, an image displayed on the display element 11a is reflected by the external proximity object, and then the light-receiving element 11b detects the reflected light. A light-receiving signal is output from the light-receiving element 11b in accordance with the detection of the reflected light. The light-receiving signal is input into the light-receiving signal processing section 13 to perform processing such as amplification of the signal (step S10 in FIG. 4). In this way, the light-receiving signal processing section 13 obtains a pickup image.

Subsequently, the light-receiving signal processing section 13 input the pickup image to the image processing section 14 to binarize the pickup image (step S 11). Namely, a preliminarily configured threshold is stored in the image processing section 14. For example, the image processing section 14 determines whether signal intensity of pickup image data is lower or higher than the threshold, and performs binarization processing in which the signal is set so as to be "0" or "1", respectively. Consequently, portions at which light reflected by an external proximity object is received are set to "1", and other portions are set to "0". Thus, one or more detection regions ("detection dots-blocks") may be determined as regions (e.g., "blocks") in which one or more light-receiving elements (e.g., "dots") receive reflected light of sufficient intensity to generate a light-receiving signal above a threshold intensity.

Then, the image processing section 14 removes an isolating point from the binarized pickup image (step S 12). Namely, in cases where a pickup image is binarized as described above, the image processing section 14 removes a portion which is isolated from an external proximity object and sets that portion to "0", so that noise is removed.

Subsequently, the image processing section 14 performs labeling in a labeling section (not shown) (step S13). Namely, in cases where a pickup image is binarized as described above, the labeling section performs labeling of a portion which is set to "1". Then, the labeling section detects a region which is set to "1" as a region of the external proximity object (e.g., a detection of possible proximity of the object to the input panel), and obtains the above described point information for each detection point of the external proximity object. The obtained point information is output to the intra-frame noise removal section 151.

Subsequently, the intra-frame noise removal section 151 uses the point information obtained by the labeling to perform intra-frame noise removal processing described below, to remove a detection point corresponding to intra-frame noise included in a frame of the pickup image (step S14). Specifically, the intra-frame noise removal section 151 uses density information, aspect ratio information, and/or area information, which are described in detail hereinafter, to determine whether the performance of processing for the detection point (processing in the control section 21) is valid or invalid.

Subsequently, the inter-frame processing section 152 determines a similarity in each of the detection points among a plurality of temporally sequential frames of the pickup image on the basis of point information of each of the detection points, and performs inter-frame processing described below in accordance with the result of the determination (step S15). The inter-frame processing is processing including tracking processing, frame interpolation processing, and burst noise removal processing described hereinafter.

Subsequently, the control section 21 uses tracking point information and status information input from the inter-frame processing section 152 to perform desired processing such as change of a display image. For example, given the case where some kind of operation menu is displayed on a screen, the control section 21 detects which button is selected from the operation menu by a finger of a user, and then executes a command corresponding to the selected button. This completes the image processing operation of the information input-output device 1.

[2. Intra-frame Noise Removal Processing]

Figure 5:
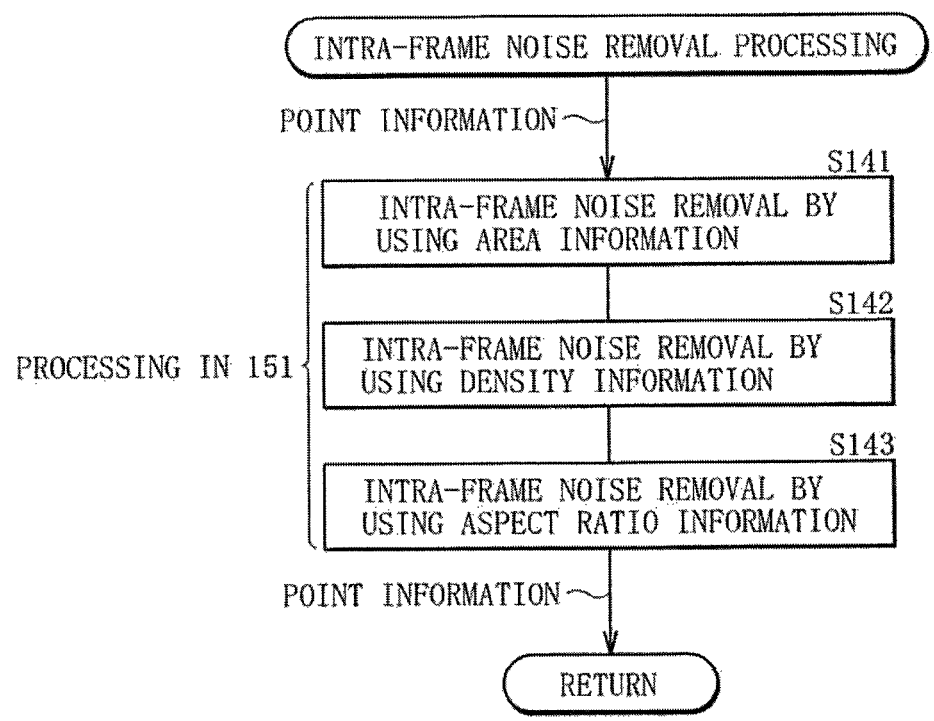
FIG. 5 is a flowchart illustrating a detailed example of removal processing of intra-frame noise shown in FIG. 4.
Figure 6:
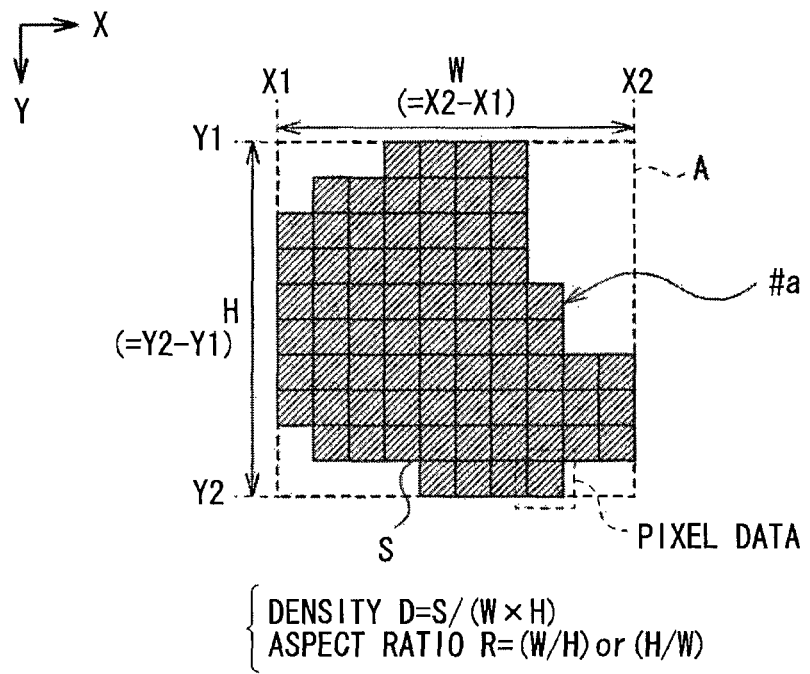
FIG. 6 is a schematic view illustrating an example of point information (detection information) of an input portion in a pickup image.

The intra-frame noise processing shown in FIG. 4 will be described in detail with reference to FIGS. 5 to 9. FIG. 5 is a flowchart illustrating the intra-frame noise processing in detail.

First, point information used in the case of the intra-frame noise processing is described in detail. The point information includes position information showing the center of gravity and a central coordinate of a detection point of an external proximity object, density information showing density of the detection point, aspect ratio information showing an aspect ratio of the detection point, and/or area information of the detection point. Specifically, in a detection point (input portion) #a shown in FIG. 6 for example, area of the detection point #a is indicated by an area S being a portion in which individual pixel data is concatenated. An aspect ratio R of the detection point #a is indicated by the ratio of length (height) H in a longitudinal direction (height direction) to length (width) W in a lateral direction (width direction) of a circumscribed rectangular region A. However, the aspect ratio R employs a ratio having a value less than 1 from two ratios W/H and H/W. In addition, position coordinates of four corners of the circumscribed rectangular region A are used to define the height H=(Y2−Y1) and the width W=(X2−X1). Density D of the detection point #a is indicated by an area ratio [=S/(W×H)] of the area S of the detection point #a to an area of the circumscribed rectangular region A (W×H).

[2-1. Removal Processing Using Area Information]

Figure 7:
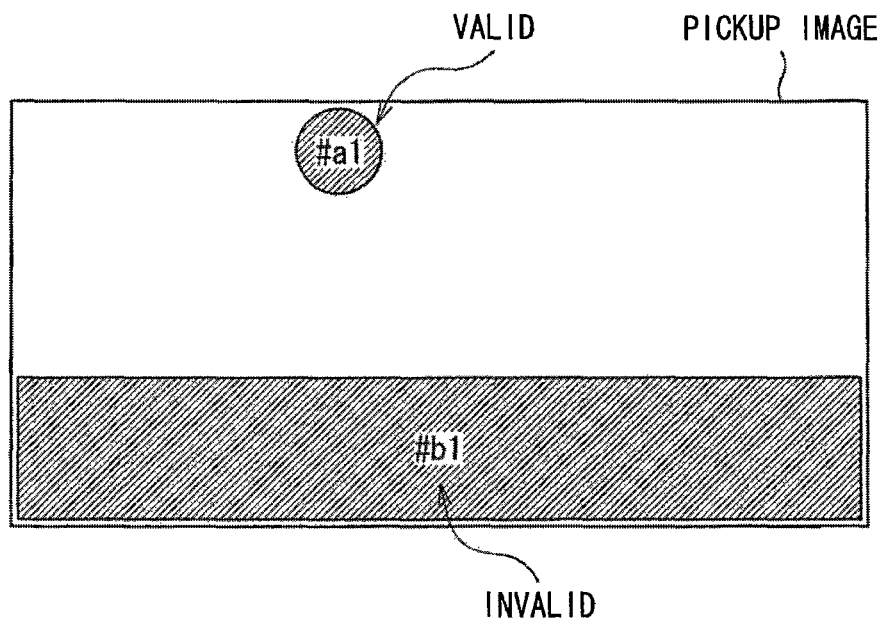
FIG. 7 is a schematic view illustrating an example of the intra-frame noise removal processing using area information shown in FIG. 5.

In the intra-frame noise processing, the intra-frame noise removal processing using the area information among the above point information is first performed in the intra-frame noise removal section 151 (step S 141 in FIG. 5). Specifically, as shown in FIG. 7 for example, the intra-frame noise removal section 151 determines whether the performance of processing for a detection point (processing in the control section 21) is valid or invalid for each detection point in accordance with a magnitude of area of the detection point. In the example of FIG. 7, because the area S of a detection point #a1 is within a predetermined range which has been preliminarily set, the performance of processing for the detection point #a1 is set to be valid. Consequently, the detection point #a1 is determined not to correspond to intra-frame noise (e.g., the detection point #a1 is determined to correspond to a valid detection of possible proximity of the object to the input panel), so that noise removal is not performed. On the other hand, because the area S of a detection point #b1 is out of the predetermined range which has been preliminarily set, the performance of processing for the detection point #b1 is set to be invalid. Consequently, the detection point #b1 is determined to correspond to intra-frame noise (e.g., it is determined that possible proximity of the object to the input panel is not detected at point #b1), so that noise removal is performed.

[2-2. Removal Processing Using Density Information]

Figure 8:
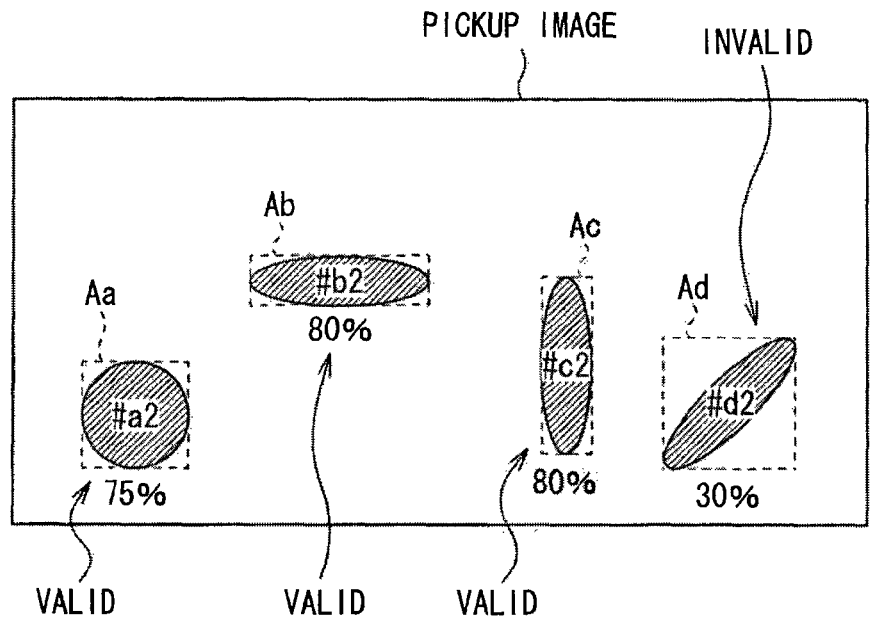
FIG. 8 is a schematic view illustrating an example of the intra-frame noise removal processing using density information shown in FIG. 5.

Subsequently, in the intra-frame noise removal section 151, intra-frame noise removal processing is performed using density information among the above point information (step S142). Specifically, as shown in FIG. 8 for example, the intra-frame noise removal section 151 determines whether the performance of processing for a detection point (processing in the control section 21) is valid or invalid (e.g., whether possible proximity of the object to the input panel is in fact detected) for each detection point in accordance with a magnitude of the density D of the detection point. In the example of FIG. 8, density D of each detection point #a2, #b2, and #c2 (circumscribe rectangular regions Aa, Ab, and Ac, respectively) are within a predetermined range which has been preliminarily set (in the example of FIG. 8, 50%≤D≤100%) (D=75%, 80%, 80%, respectively). Consequently, the performance of processing for the detection points #a2, #b2, and #c2 is set to be valid. As a result, the detection points #a2, #b2, and #c2 are determined not to correspond to the intra-frame noise, so that noise removal is not performed. On the other hand, because the density D of a detection point #d2 is out of the predetermined range which has been preliminarily set (50%≤D≤100%) (D=30%), the performance of processing for the detection point #d2 is set to be invalid. Consequently, the detection point #d2 is determined to correspond to the intra-frame noise, so that noise removal is performed.

[2-3. Removal Processing Using Aspect Ratio Information]

Figure 9:
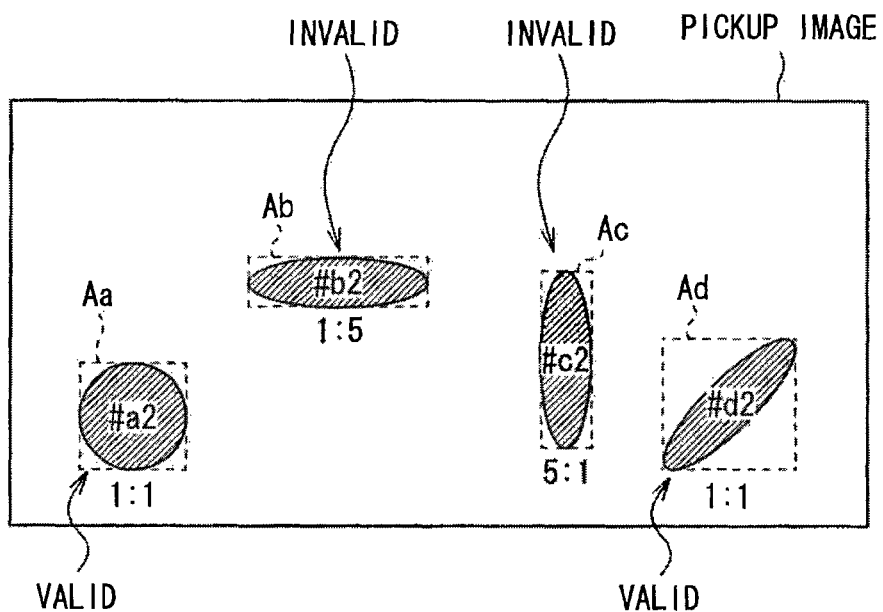
FIG. 9 is a schematic view illustrating an example of the intra-frame noise removal processing using aspect ratio information shown in FIG. 5.

Subsequently, in the intra-frame noise removal section 151, intra-frame noise removal processing is performed using the aspect ratio information among the above point information (step S143). Specifically, as shown in FIG. 9 for example, the intra-frame noise removal section 151 determines whether the performance of processing for a detection point (processing in the control section 21) is valid or invalid for each detection point in accordance with a magnitude of the aspect ratio R of the detection point. In the example of FIG. 9, the aspect ratios R of detection points #a2 and #d2 are within a predetermined range which has been preliminarily set (in the example of FIG. 9, 50%≤R≤100%) (R=100% in both of the detection points). Consequently, the performance of processing for the detection points #a2 and #d2 is set to be valid. As a result, the detection points #a2 and #d2 are determined not to correspond to the intra-frame noise, so that noise removal is not performed. On the other hand, because the aspect ratios R of detection points #b2 and #c2 are out of the predetermined range which has been preliminarily set (50%≤R≤100%) (R=20% in both of the detection points), the performance of processing for the detection points #b2 and #c2 is set to be invalid. Consequently, the detection points #b2 and #c2 are determined to correspond to the intra-frame noise, so that noise removal is performed.

In this way, the intra-frame noise removal processing shown in the steps S141 to S143 is performed, so that the intra-frame noise is effectively removed, resulting in the appropriate performance of processing for the detection point (processing in the control section 21). It should be appreciated that any combination of area measures, density measures and/or aspect ratio measures may be utilized in intra-frame noise processing, and some measures may be omitted in various embodiments in accordance with the present disclosure.

[3. Inter-frame Processing]

Figure 10:
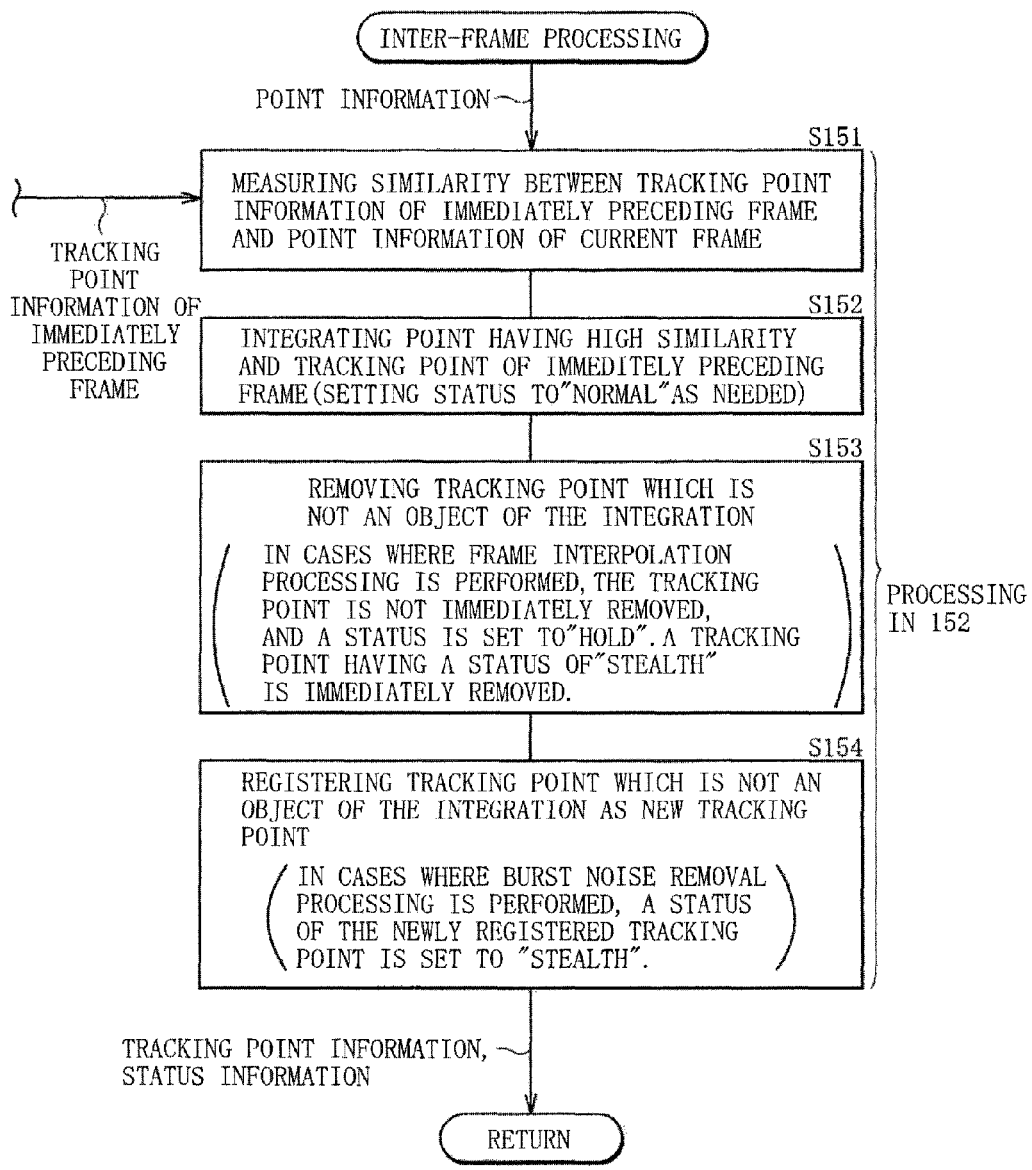
FIG. 10 is a flowchart illustrating a detailed example of the inter-frame processing shown in FIG. 4.

The inter-frame processing shown in FIG. 4 will be described in detail with reference to FIGS. 10 to 14. FIG. 10 is a flowchart illustrating the inter-frame processing in detail.

[3-1. Tracking and Integration Processing]

The inter-frame processing section 152 calculates a similarity between tracking point information (point information and identification information) in each detection point (tracking point) of a frame immediately prior to a current frame and point information in each detection point (input portion) of the current frame (step S151 in FIG. 10). The similarity is a parameter comprehensively calculated from a distance, area, density, and/or an aspect ratio between detection points on the basis of position information, density information, aspect ratio information, and/or area information included in the point information. For example, the similarity may be defined by an evaluation value obtained by calculating differences, such as a distance, area, density, and an aspect ratio, between the detection point in the immediately preceding frame and the detection point in the current frame, multiplying each of the differences by a separate coefficient, and summing the product thereof. The inter-frame processing section 152 determines that the similarity is high when the evaluation value is equal to or less than a predetermined threshold value, and determines that the similarity is low when the evaluation value is more than the predetermined threshold value. As for the evaluation value, any single attribute or combination of one or more attributes such as the distance, the area, the density, and/or the aspect ratio may be used. Alternatively, a change rate or the like may be used for the evaluation value, rather than the differences of the respective attributes. Then, the inter-frame processing section 152 regards each detection point pair (a detection point of a current frame and a tracking point of an immediately preceding frame) having high similarity as detection points corresponding to the same external proximity object, and performs integration (merging) processing described below (step S152). Then, the inter-frame processing section 152 assigns a detection point and tracking point to be integrated with individual identification information [identification data (ID)], and performs the tracking processing using the ID in a subsequent frame. In this case, status information of each detection point determined to have a high similarity may be set to "Normal", if desired. Thus, if a detection point in the current frame is highly similar to a detection point in the preceding frame, it may be determined that proximity of the same object to the input panel is detected in the current frame as in the preceding frame.

Figure 11A:
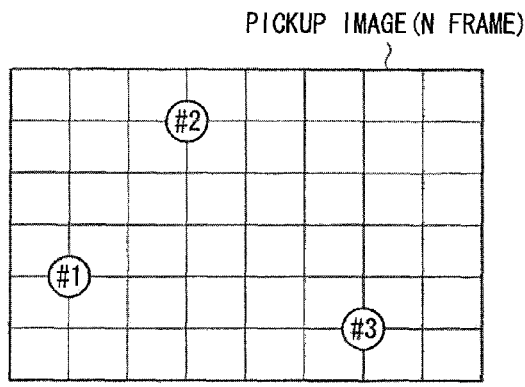
FIG. 11A is a schematic view schematically illustrating an example of the inter-frame processing shown in FIG. 10.
Figure 11B:
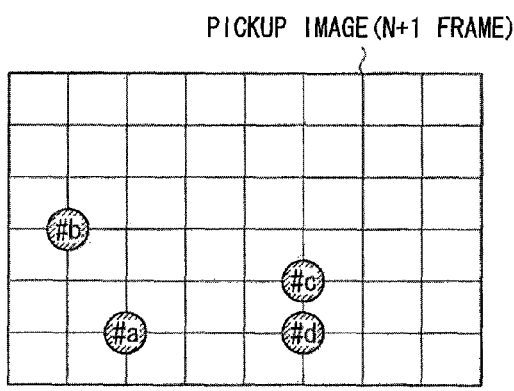
FIG. 11B is a schematic view schematically illustrating an example of the inter-frame processing shown in FIG. 10.
Figure 11C:
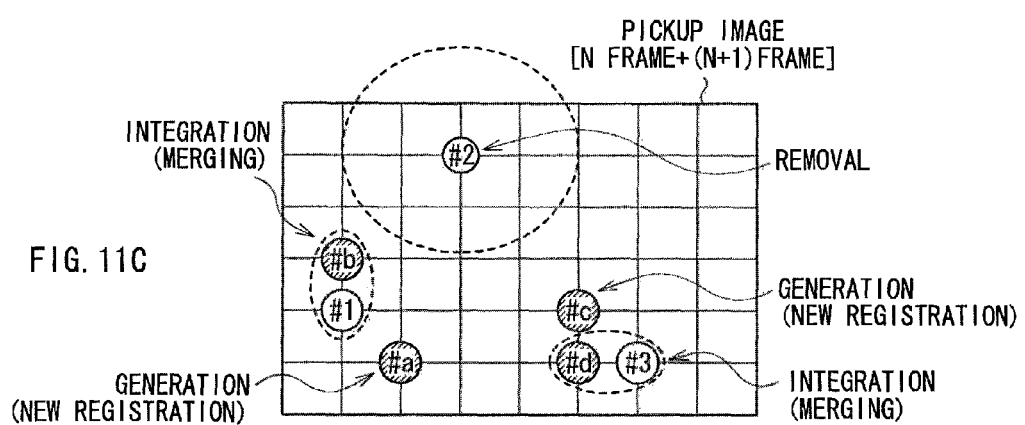
FIG. 11C is a schematic view schematically illustrating an example of the inter-frame processing shown in FIG. 10.

Specifically, for example, it is assumed that three detection points (tracking points) #1 to #3 exist in an arbitrary N frame of a pickup image as shown in FIG. 11A, and that four detection points (input portion) #a to #d exist in an (N+1) frame immediately subsequent to the N frame as shown in FIG. 11B. When, the pickup images of the N frame and the (N+1) frame are each overlapped, a state shown in FIG. 11C is exhibited.

In this case, in the step S151, the similarity are individually calculated between the three detection points (tracking points) #1 to #3 and the four detection points (input portions) #a to #d as described above. In the embodiment, as shown in FIG. 11C, it is determined that the similarity is high between the detection point (tracking point) #1 and the detection point (input portion) #b, and between the detection point (tracking point) #3 and the detection point (input portion) #d. Accordingly, in the step S152, the integration (merging) processing is performed to the detection point #1 and the detection point #b and to the detection point #3 and the detection point #d, the individual ID is assigned thereto, and tracking processing using the ID is performed in a subsequent frame.

[3-2. Frame Interpolation Processing]

On the other hand, subsequently, the inter-frame processing section 152 removes a tracking point which is not an object of the integration processing described above (step S153). Namely, the current frame is determined not to have a detection point having a high similarity compared with an immediately preceding frame, and thus the inter-frame processing section 152 deletes the isolating detection point which is newly determined in the immediately preceding frame. Specifically, in an example shown in FIG. 11C, the detection point (tracking point) #2 is removed.

Figure 12:
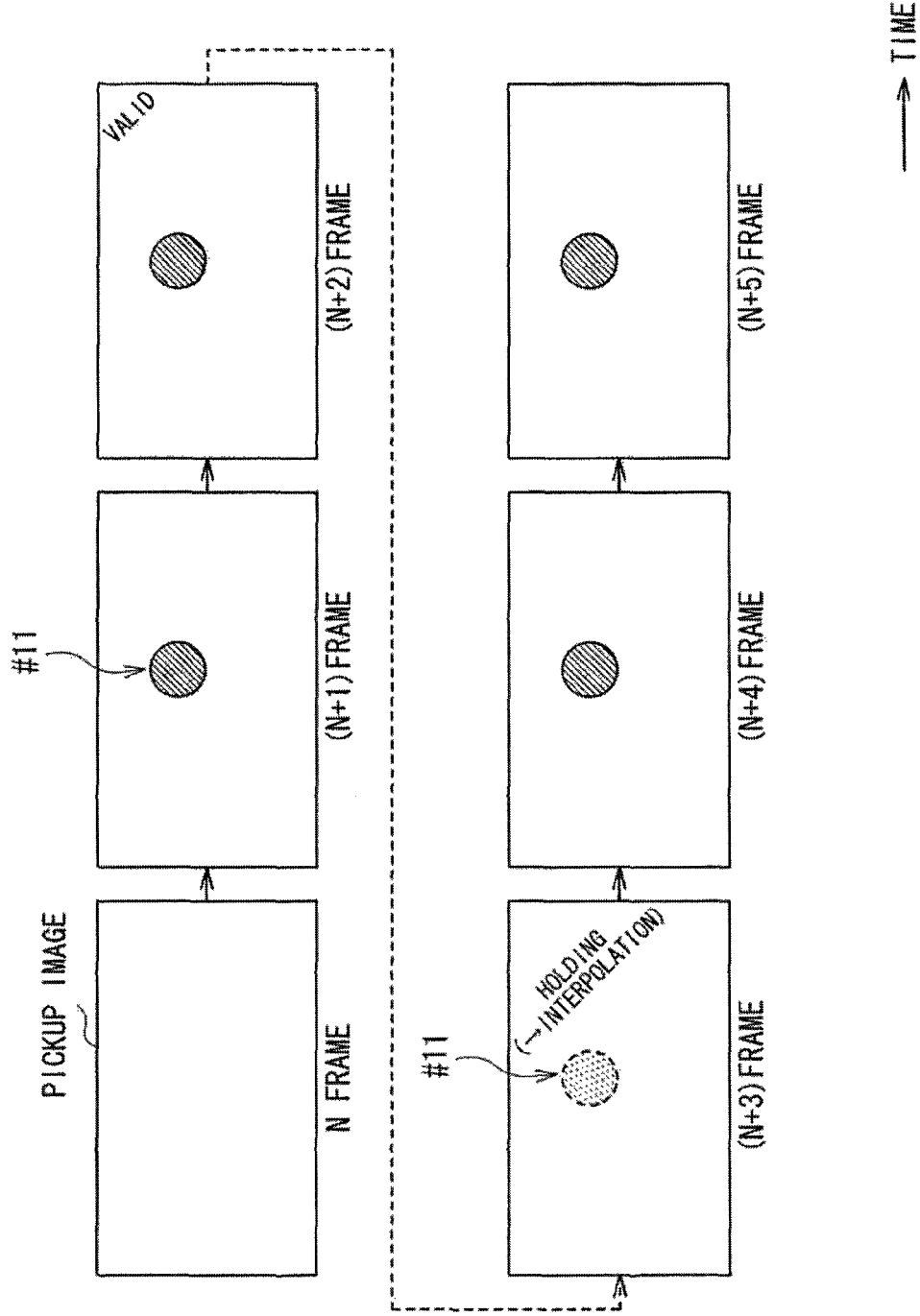
FIG. 12 is a schematic view illustrating an example of the frame interpolation processing shown in FIG. 10.
Figure 13:
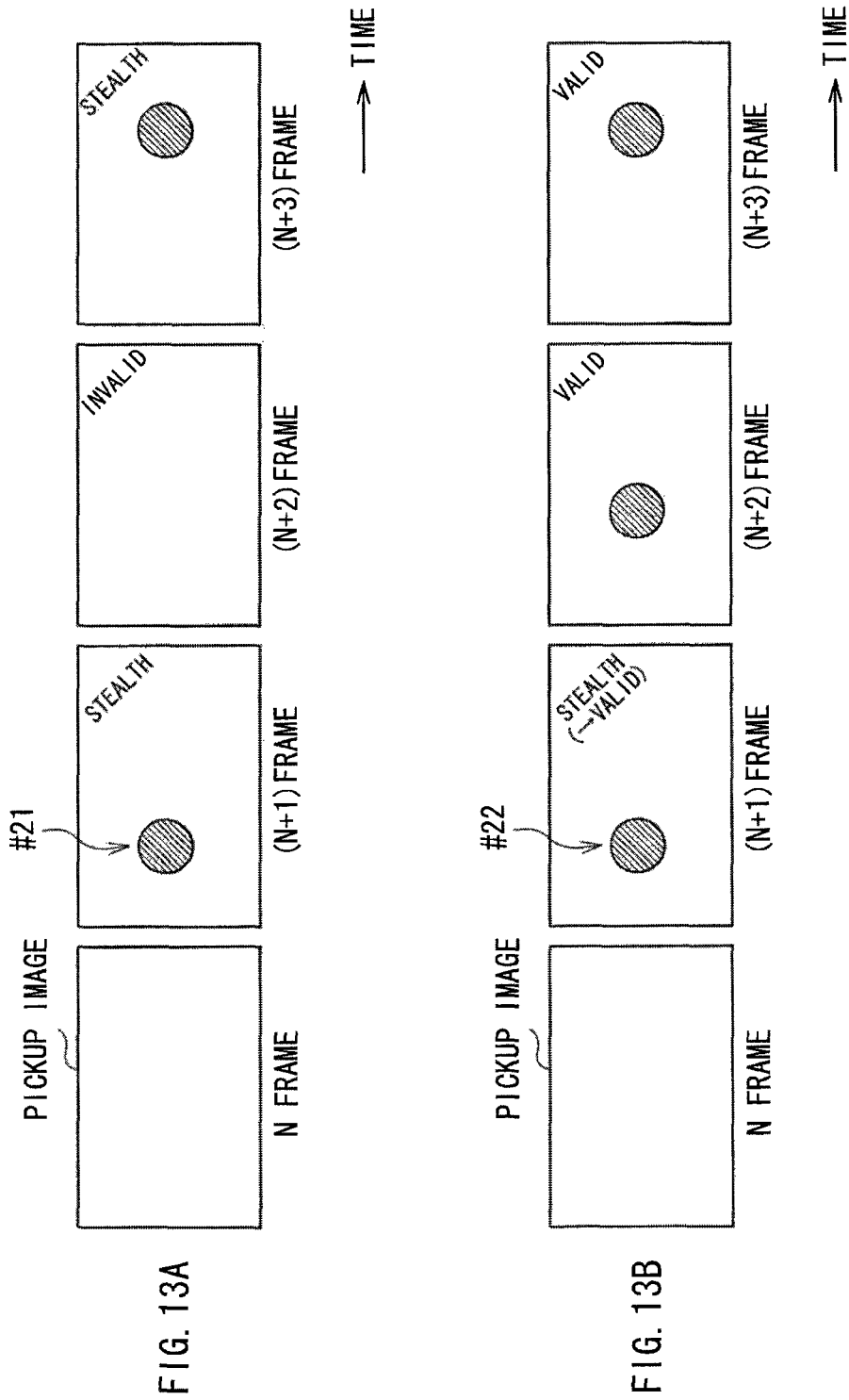
FIG. 13A is a schematic view illustrating an example of the burst noise removal processing shown in FIG. 10.
FIG. 13B is a schematic view illustrating an example of the burst noise removal processing shown in FIG. 10.
Figure 14:
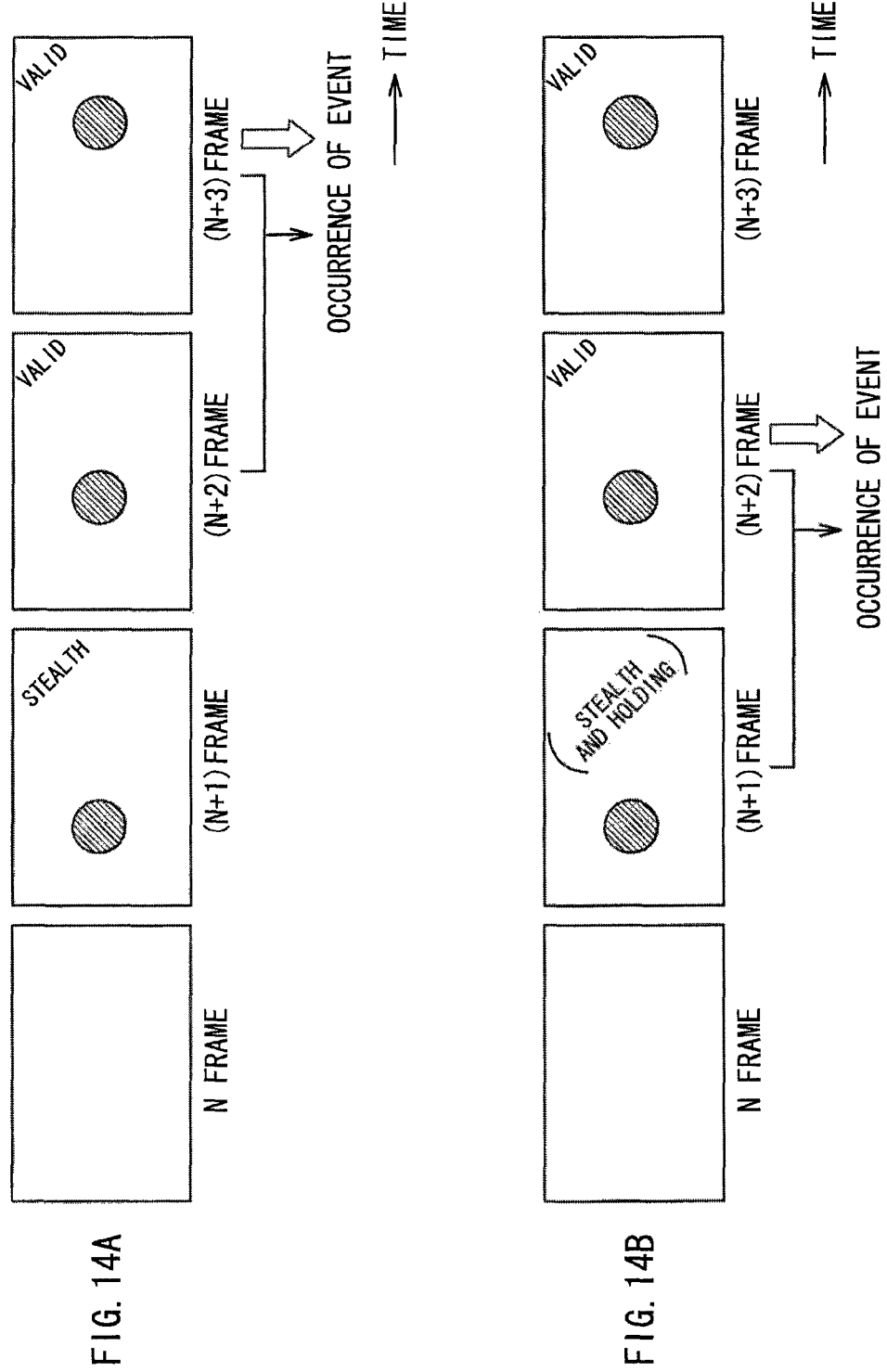
FIG. 14A is a schematic view illustrating another example of the burst noise removal processing shown in FIG. 10.
FIG. 14B is a schematic view illustrating another example of the burst noise removal processing shown in FIG. 10.

However, at this time, for example, the inter-frame processing section 152 performs frame interpolation processing as shown in FIG. 12 not to immediately remove such a tracking point (isolating detection point). Specifically, the inter-frame processing section 152 assigns status information showing "Hold" to such a tracking point (isolating detection point), and temporarily holds point information and ID for the isolating detection point. Then, the inter-frame processing section 152 performs the frame interpolation processing of a detection point using the held point information and identification information in a current frame in accordance with the result of the determination of a similarity in a subsequent frame. Namely, in an example shown in FIG. 12 for example, a detection point #11, assigned with the status information indicating "Normal" in a (N+2) frame of a pickup image, has been determined not to exist in a subsequent (N+3) frame. Consequently, the detection point (tracking point) #11 in the (N+3) frame is first assigned with the status information showing "Hold", and the point information and the ID are temporarily held. Then, when it is determined again that a detection point having a high similarity to the detection point (tracking point) #11 exists in a subsequent (N+4) frame, the frame interpolation processing of the detection point (tracking point) #11 is retrospectively performed in the (N+3) frame, and it is determined that proximity of the object to the input panel is detected for the (N+3) frame. As a result, the loss of the detection point in the (N+3) frame is precluded, so that it is possible to effectively utilize information. Meanwhile, a tracking point having a status of "Stealth (undetermined)" (which will be described in detail hereinafter) for example is immediately removed in the frame interpolation processing.

[3-3. Burst Noise Removal Processing]

Subsequently, the inter-frame processing unit 152 registers a detection point (input portion) which is not an object of the integration processing described above as a newly-generated tracking point (step S154). Namely, the inter-frame processing unit 152 performs new registration for a detection point (input portion) which is determined to have a low similarity to any other detection points among a plurality of frames as in the case of the detection point (input portion) #a and #c shown in FIG. 11C, and assigns new ID thereto.

However, at this time, the inter-frame processing section 152 performs burst noise removal processing, and does not immediately perform new registration for such a detection point (isolating detection point), and sets a status information thereof to "Stealth" ("undetermined"), for example, as shown in FIGS. 13A and 13B. Namely, the inter-frame processing section 152 assigns an isolating detection point, which has been newly determined in a current frame, with status information showing stealth status, to temporarily suspend the performance of processing (processing in the control section 21) for the isolating detection point. Then, the inter-frame processing section 152 retrospectively performs processing on the isolating detection point in accordance with the result of the determination of a similarity in a subsequent frame. Specifically, in an example shown in FIG. 13A, a detection point (input portion) #21 has been newly detected in each of (N+1) and (N+3) frames of a pickup image. In this case, status information of the detection point (input portion) #21 in each of the frames is set to "Stealth (undetermined)". On the other hand, in an example shown in FIG. 13B, a detection point (input portion) #22 has been newly detected in a (N+1) frame of a pickup image. In this case, status information of the detection point #22 in the (N+1) frame is set to "Stealth (undetermined)". Then, on the basis of the result of the subsequent determination of a similarity in the (N+1) frame, detection points in the (N+1) frame and a (N+2) frame are determined to have a high similarity each other, so that the status information of the detection point #22 in the (N+1) frame is retrospectively set to "Normal", and it is determined that proximity of the object to the input panel is detected for the (N+1) frame.

Thus, isolating detection points are at first assigned status information showing "Stealth (undetermined)". This makes it possible for an application (control section 21) to ignore information which may be burst noise. Meanwhile, in FIGS. 13A and 13B, although the status information showing "Stealth (undetermined)" is set in only a first frame, it is possible for users to arbitrarily change the number of new registration frames to be set to "Stealth (undetermined)".

However, in cases where such burst noise removal processing is performed as shown in FIGS. 13B and 14A, time delay otherwise may be caused during the occurrence of an event (processing in the control section 21). Accordingly, as shown in FIG. 14B for example, it is preferable that, when a newly determined isolating detection point is to be assigned with the status information showing "Stealth (undetermined)", the inter-frame processing section 152 temporarily hold point information and ID of that isolating detection point. This makes it possible for the event (processing in the control section 21) to occur using the held point information and identification information in a subsequent frame, so that the time delay described above is excluded. Thus, a display image associated with the current frame may be controlled based on the point information of the detection in the current frame.

In this way, even when the isolating detection point is generated due to, for example, the generation of noise between frames and the loss of information between frames, the performance of processing for the isolating detection point is temporarily suspended, by performing the inter-frame processing shown in the steps S151 to S154. Also, because the processing is retrospectively performed in accordance with the result of the determination of a similarity in a subsequent frame, processing for a detection point (processing in the control section 21) is more appropriately performed.

Therefore, according to the present embodiment, in the inter-frame processing section 152, a similarity is determined in each detection point among a plurality of frames different from each other (among a plurality of temporally sequential frames of a pickup image) on the basis of point information of each of the detection points, and the inter-frame processing (processing including tracking processing, frame interpolation processing, and burst noise removal processing) is performed in accordance with the result of the determination. Specifically, with respect to an isolating detection point which is a detection point determined to have a low similarity to other detection point, the performance of processing (processing in the control section 21) for a detection point is temporarily suspended among a plurality of frames, and the processing for the isolating detection point is retrospectively performed in accordance with the result of the determination of a similarity in a subsequent frame. Consequently, even when the isolating detection point is generated due to, for example, the generation of noise between frames and the loss of information between frames, it is possible to more appropriately perform processing for a detection point. As a result, it is possible to surely input information on an external proximity object regardless of status of use.

Further, in the intra-frame noise removal section 151, density information, aspect ratio information, and/or area information from among point information output from the image processing section 14 may be used to determine whether the performance of processing (processing in the control section 21) for the detection point is valid or invalid for each detection point in accordance with density, an aspect ratio, and/or amount of an area of the detection point, so as to remove a detection point corresponding to intra-frame noise included in a frame of a pickup image. Consequently, it is possible not only to effectively exclude the generation of noise between frames and exclude the loss of information between frames, but also to effectively remove intra-frame noise, so that it is possible to further surely input information on an external proximity object regardless of status of use.

II. Modifications

Some modifications of the invention will be described hereinafter. The same elements as those in the embodiment described above are denoted with the same reference numerals, and the description thereof will not be provided in detail.

[First Modification]

Figure 15:
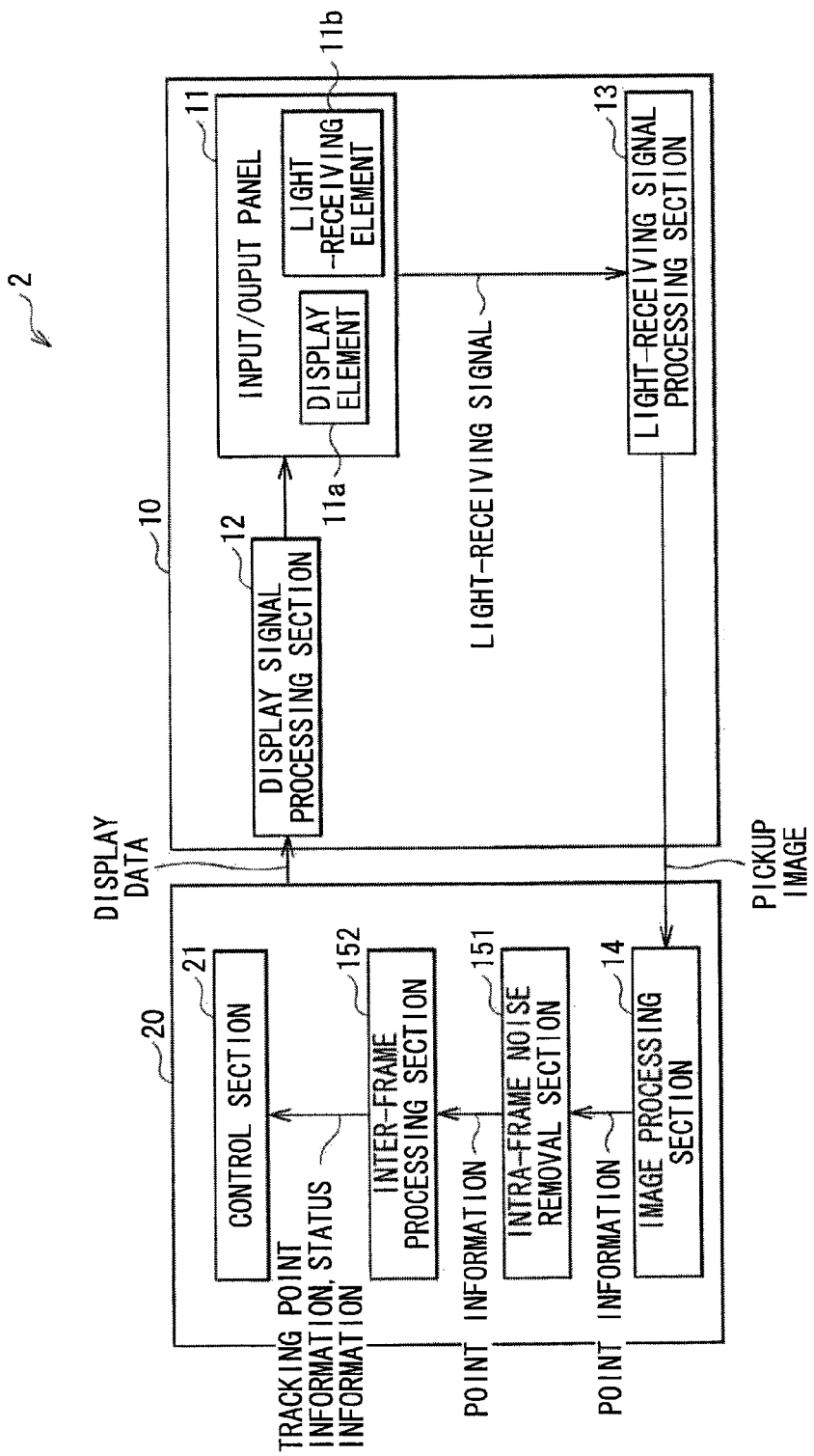
FIG. 15 is a block diagram illustrating the configuration of an information input-output device according to a first modification of the embodiment of the invention.

FIG. 15 illustrates the block configuration of an information input-output device 2 according to a first modification of the embodiment of the invention. Compared with the information input-output device 1 according to the embodiment described above, the information input-output device 2 differs in that the electronic unit body 20 is provided with the image processing section 14, the intra-frame noise removal section 151, and the inter-frame processing section 152.

Namely, in the information input-output device 2, the display 10 is provided with the display signal processing section 12, the input-output panel 11, and the light-receiving signal processing section 13. In addition, the electronic unit body 20 is provided with the control section 21, the image processing section 14, the intra-frame noise processing section 151, and the inter-frame processing section 152. The information input-output device 2 having such configuration also exerts an effect which is similar to that of the information input-output device 1 of the embodiment described above.

[First Modification and Second Modification]

Although the embodiment of the invention has been hereinto described by way of example with reference to the information input-output devices 1 and 2 including the input-output panel 11 (devices including an optical touch sensor) having the plurality of display elements 11a and light-receiving elements 11b, the invention is also applicable to an input-output panel having other configuration.

[Second Modification]

Figure 16:
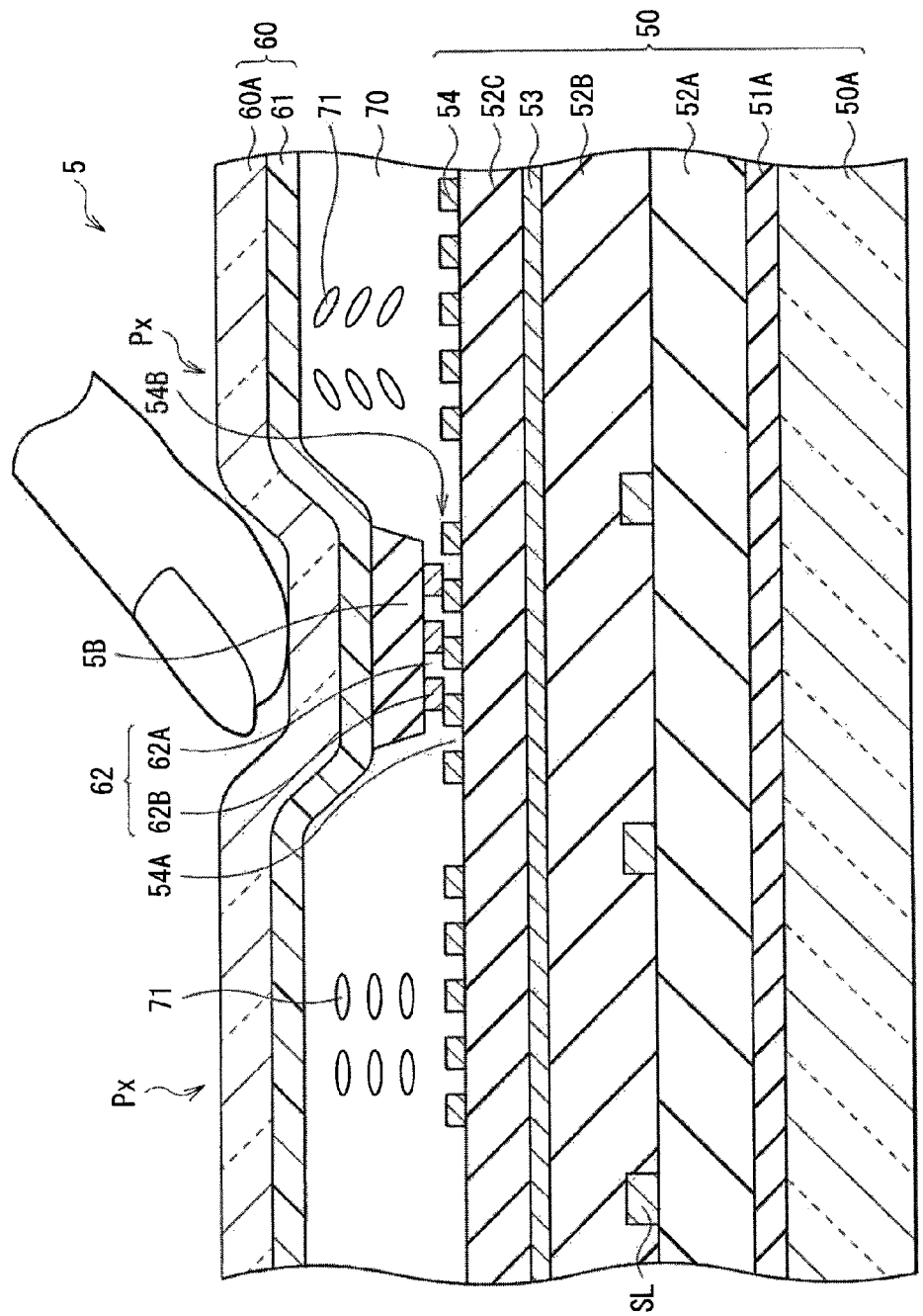
FIG. 16 is a cross sectional view illustrating the configuration of an input-output panel according to a second modification of the embodiment of the invention.

FIG. 16 illustrates a cross-sectional configuration of a pixel Px in an input-output panel 5 (including a contact type touch sensor) according to a second modification of the embodiment of the invention. The input-output panel 5 includes a first substrate 50, a second substrate 60, and a liquid crystal layer 70 containing liquid crystal molecules 71. The first substrate 50 has a glass substrate 50A, a gate insulating film 51A, a first interlayer insulating film 52A, a signal line SL, a second interlayer insulating film 52B, a common electrode 53, a third interlayer insulating film 52C, and a pixel electrode 54 (first sensor electrode). The second substrate 60 has a glass substrate 60A, a color filter 61, and a counter sensor electrode 62 (second sensor electrode). Namely, a contact type touch sensor is configured with the pixel electrode 54 and the counter electrode 62 inside the input-output panel 5. The pixel electrode 54 has, for example, cross sectional shape including a plurality of edges 54B. An orientation film (not shown) becomes thinner at the edge 54B, and the edge 54B is exposed from the orientation film. The counter sensor electrode 62 (including a slit 62A and a pattern 62B) is disposed facing the edge 54B. Consequently, the bend of the second substrate 60 leads the counter sensor electrode 62 to contact with the exposed edge 54B of the pixel electrode 54 to be directly in conduction with each other, so that instability of position detection is suppressed. Thus, a representation of possible proximity (e.g., contact) of an object to the input panel may be determined based on one or more electrical contacts made by compression of a portion of the input panel. Especially, in cases where the input-output panel 5 is a fringe field switching (FFS) liquid crystal display panel, because the pixel electrode 54 originally has a planar shape originally including a plurality of the slits 54A, it is possible to improve performance of the position detection without decreasing aperture ratio.

[Third Modification]

Figure 17:
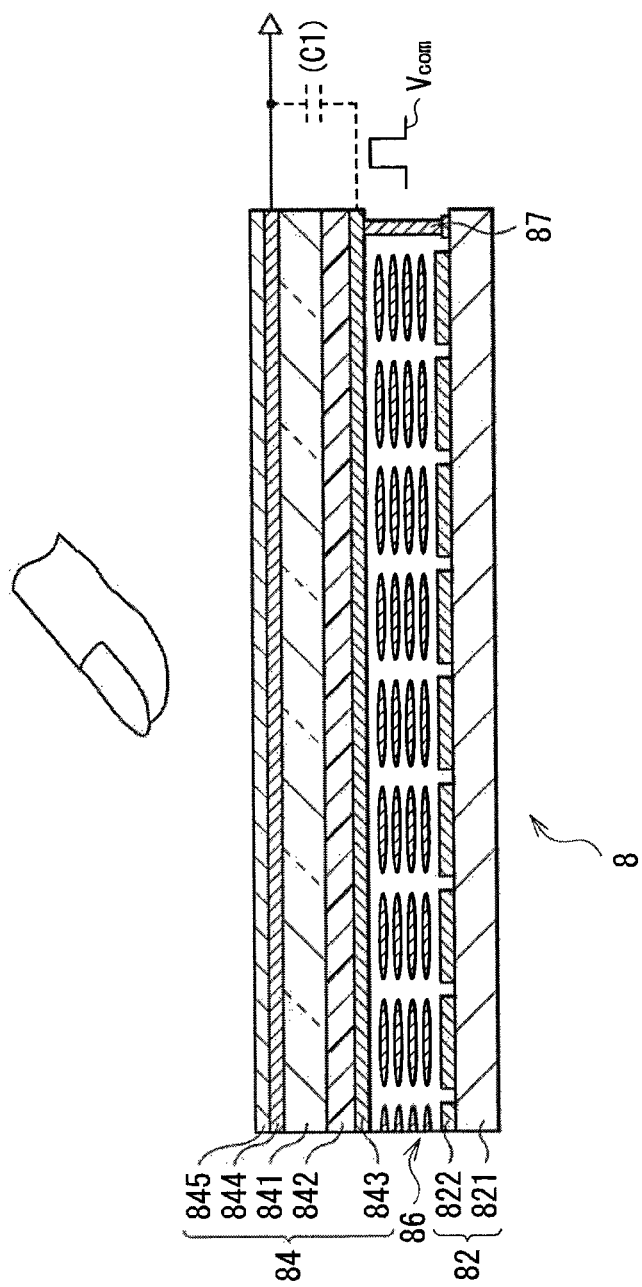
FIG. 17 is a cross sectional view illustrating the configuration of an input-output panel according to a third modification of the embodiment of the invention.

FIG. 17 illustrates a cross-section configuration of a pain part of an input-output panel 8 (an input-output panel including a capacitive touch sensor) according to a third modification of the embodiment of the invention. The input-output panel 8 uses a liquid crystal display device as a display device, and the capacitive touch sensor is configured by using a part of an electrode (a common electrode 843 described hereinafter) originally included in the liquid crystal display device and using a display driving signal (a common driving signal Vcom described hereinafter) in a shared fashion. The input-output panel 8 includes a pixel substrate 82, a counter substrate 84 disposed so as to face the pixel substrate 82, and a liquid crystal layer 86 disposed between the pixel substrate 82 and the counter substrate 84.

The pixel substrate 82 has a thin film transistor (TFT) substrate 821 serving as a circuit board and a plurality of pixel electrodes 822 disposed on the TFT substrate 831 in a matrix form. A display driver, a TFT for driving each of the pixel electrodes 822, and interconnections such as a source line for supping each of the pixel electrodes with an image signal and a gate line for driving each TFT, are formed on the TFT substrate 821 (each of which is not shown). A detection circuit for performing touch detection operation may be formed on the TFT substrate 821.

The counter substrate 84 has a glass substrate 841, a color filter 842 disposed on one surface of the glass substrate 841, and the common electrode 843 formed on the color filter 842. In the color filter 842, for example, color filter layers of three-color including red (R), green (G), and blue (B) are periodically disposed, and each three color of the R, G, and B is associated as a set for each of the display pixels (pixel electrode 822). The common electrode 843 is also used as a driving electrode for a sensor, the driving electrode constituting a part of a touch sensor for performing touch detection operation.

The common electrode 843 is connected to the TFT substrate 821 by a contact conductive cylinder 847. The common driving signal Vcom having an alternate current (AC) rectangular waveform is applied from the TFT substrate 821 to the common electrode 843 through the contact conductive cylinder 847. The common driving signal Vcom defines display voltage of each pixel in conjunction with a pixel voltage applied to the pixel electrode 822, and is also used as a driving signal for the touch sensor. Namely, the polarity of the common driving signal Vcom is reversed in a predetermined cycle.

A sensor detection electrode 844 (touch detection electrode) is formed on another surface of the glass substrate 841. Furthermore, a polarizing plate 845 is disposed on the sensor detection electrode 844. The sensor detection electrode 844 constitutes a part of the touch sensor.

The liquid crystal layer 86 modulates light passing through the layer 86 in accordance with a state of an electrical field. For example, various types of liquid crystal are used, for example, twisted nematic (TN) type liquid crystal, vertical alignment (VA) type liquid crystal, and electrically controlled birefringence (ECB) type liquid crystal.

The orientation film is each disposed between the liquid crystal layer 86 and the pixel substrate 82 and disposed between the liquid crystal layer 86 and the counter substrate 84. A light-incident-side polarizing plate is disposed on an under surface of the pixel substrate 82. The orientation film and the polarizing plate are not shown in the figures.

In the input-output panel 8, for example, when a finger of a user contacts to or approaches any position on a surface of the counter substrate 84, capacitance of an capacitive element originally generated at the touch position is changed due to the contacting or approaching finger. As a result, a value of a detection signal Vdet at the time when the touch position is scanned (i.e., at the time when the common driving signal Vcom is applied to an electrode pattern corresponding to the touch position in an electrode pattern of the common electrode 843) becomes lower than that in other position. The detection circuit compares the detection signal Vdet with a threshold voltage Vth, and determines that a portion having the detection signal Vdet less than the threshold voltage Vth is the touch position. It is possible to determine the touch position from timing of the application of the common driving signal Vcom and from timing of the detection of the detection signal Vdet less than the threshold voltage Vth. Thus, a representation of possible proximity of an object to the input panel may be determined based on a change in capacitance of one or more capacitive elements of the input panel.

III. Application Examples

Application examples of the information input-output device described with reference to the above embodiment and the modifications will be described with reference to FIGS. 18 to 22. Each of the information input-output devices according to the embodiment and the modifications is applicable to every field of an electronic unit, such as a television apparatus, a digital camera, a laptop, a mobile terminal apparatus such as a mobile phone, a camcorder, and so forth. In other words, it is possible to apply each of the information input-output devices of the embodiment and modifications to every field of electric apparatus in which an externally input video signal or an internally generated video signal is displayed as an image or video picture.

Application Example 1

Figure 18:
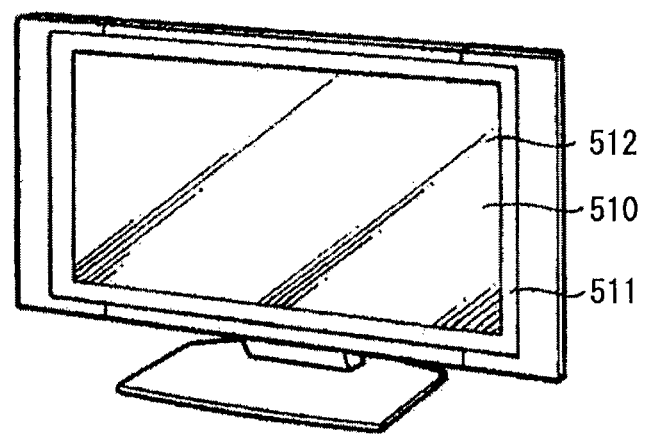
FIG. 18 is a perspective view illustrating the appearance of a first application example of an information input-output device of the embodiment of the invention.

FIG. 18 illustrates an appearance of a television apparatus to which the information input-output device according to any one of the embodiment and modifications is applied. For example, the television apparatus has a video display screen 510 including a front panel 511 and filter glass 512, and the video display screen 510 is configured with the information input-output device according to any one of the embodiment and modifications.

Application Example 2

Figure 19A:
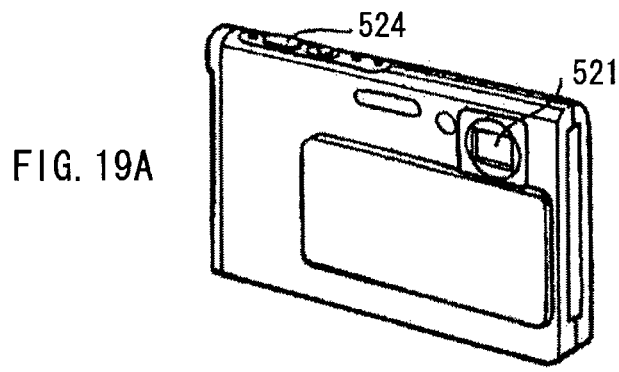
FIG. 19A is a perspective view illustrating the appearance of a second application example viewed from a front side.
Figure 19B:
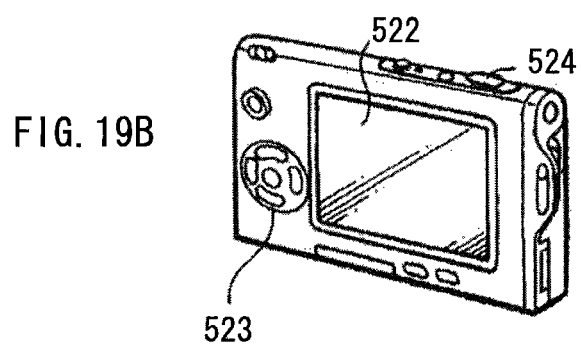
FIG. 19B is a perspective view illustrating the appearance of a second application example viewed from a rear side.

FIGS. 19A and 19B illustrate an appearance of a digital camera to which the information input-output device according to any one of the embodiment and modifications is applied. For example, the digital camera has a light emitting section 521 for a flash, a display 522, a menu switch 523, and a shutter release button 524, and the display 522 is configured with the information input-output device according to any one of the embodiment and modifications.

Application Example 3

Figure 20:
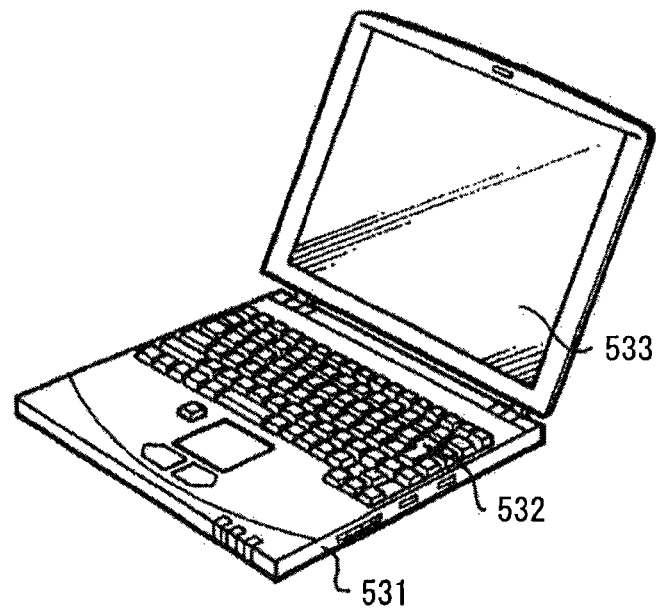
FIG. 20 is a perspective view illustrating the appearance of a third application example.

FIG. 20 illustrates an appearance of a laptop to which the information input-output device according to any one the embodiment and modifications is applied. For example, the laptop has a body 531, keyboard 532 for the input operation of a letter or the like, and a display 533 for displaying an image, and the display 533 is configured with the information input-output device according to any one of the embodiment and modifications.

Application Example 4

Figure 21:
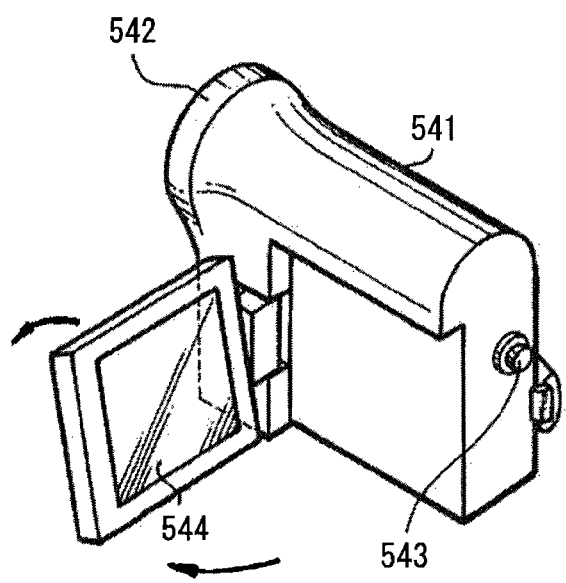
FIG. 21 is a perspective view illustrating the appearance of a fourth application example.

FIG. 21 illustrates an appearance of a video camera to which the information input-output device according to any one of the embodiment and modifications is applied. For example, the video camera has a body 541, a lens 542 which is provided on a front side of the body 541 for shooting a subject, a start/stop switch 543 at shooting, and a display 544, and the display 544 is configured with the information input-output device according to any one of the embodiment and modifications.

Application Example 5

FIGS. 22A to 22G illustrate respectively an appearance of a mobile phone to which the information input-output device according to any one of the embodiment and modifications is applied. For example, the mobile phone has an upper housing 710, an under housing 720, a connection 730 (hinge) connecting the upper housing 710 to the under housing 720, a display 740, a sub-display 750, a picture light 760, and a camera 770. The display 740 or the sub-display 750 is configured with the information input-output device according to any one of the embodiment and modifications.

[Alternative Modifications]

Although the invention has been described by way of example with reference to the embodiment, modifications, and applications described above, the invention is not limited to these and may be variously modified.

For example, each of the steps S141 to S143 described in the embodiment and so forth is not limited to an order of performance shown in FIG. 5, and may be performed in any order. Also, all of the steps S141 to S143 may not be necessarily performed, i.e. one or more thereof may be performed. Similarly, each of the steps S151 to S154 described in the embodiment and so forth is not limited to an order of performance shown in FIG. 10. For example, the steps S153 and S154 may be inversely performed. Furthermore, the point information described in the above embodiment and so forth may not include all of the position information, the density information, the aspect ratio information, and the area information. The point information may include at least the position information. Namely, in some embodiments, each of the steps S141 to S143 described in the embodiment and so forth may not be performed, and only the steps S151 to S154 may be performed.

In the above embodiment and so forth, although the case that the control section 21 is provided in the electronic unit body 20 has been described, the control section 21 may be provided in the display 10.

Furthermore, in the examples shown in FIGS. 2 and 3, although a single light-receiving cell is provided for a single light-emitting cell, the single light-receiving cell may be provided for a plurality of the light-emitting cells.

In addition, in the above embodiment and so forth, although the information input-output device in which the display panel and the touch sensor (touch panel) are integrally provided on one substrate (an information input-output device provided with an input-output panel) has been described, the invention is not limited thereto. Namely, the embodiment and so forth of the invention are also applicable to, for example, an information input-output device to which a touch sensor is provide on an outside of a display device (an information input-output device including an external touch sensor).

In the above embodiment and so forth, the configuration using the liquid crystal display panel has been described as the input-output panel. However, the information input-output device according to any one of the embodiment and so forth of the invention may also employ a configuration in which an organic electroluminescence (EL) panel or the like is used as the input-output panel. The organic EL device has characteristics that the application of forward bias voltage leads to luminescence, and that the application of reverse bias voltage leads to receiving light and the generation of electric current. Accordingly, the organic EL device comes to have the display element 11a and the light-receiving element 11b. The input-output panel 11 is configured by disposing the organic EL devices for each pixel 16. The forward bias voltage is applied to each of the organic EL devices in accordance with display data to produce luminescence, so that an image is displayed, and the reverse bias voltage is applied to other organic EL devices to receive reflected light.

Furthermore, in the embodiment and so forth, although the information input-output device including the input-output panel having the plurality of display elements and the plurality of light-receiving elements (the input-output panel having the detection function for detecting the external proximity object and the image display function) has been described, the invention is not limited thereto. Specifically, the embodiment and so forth of the invention are applicable to an information input device (an image-pickup device having the plurality of light-receiving elements) including an input panel having a detection function for detecting an external proximity object. Namely, such input panel and an output panel (display panel) in which image display is performed on the basis of display data generated by the control section 21 may be separately provided. In this case, the detection signal for one detection screen of the input panel corresponds to a detection signal configuring one detection frame.

Also, a series of the processing described in the embodiment and so forth may be executed with hardware or software. In cases where the series of the processing is performed with the software, a program configuring the software may be installed on a general-purpose computer or the like. Such program may be preliminarily recorded in a recording medium embedded in a computer. In this respect, some embodiments may be implemented using one or more tangible, non-transitory computer-readable storage media encoded with computer-executable instructions that, when executed by one or more processors, perform any of the functions described herein.

The present application contains subject matter related to that disclosed in Japanese Priority Patent Application JP 2009-126488, filed in the Japan Patent Office on May 26, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for detecting proximity of an object, the apparatus comprising:
   an input panel comprising at least one detection element; and
   at least one circuit configured to:
   determine, from a first input frame in which input is received via the at least one detection element, a first representation of possible proximity of the object to the input panel;
   determine, from a second input frame in which input is received via the at least one detection element, the second input frame being generated after the first input frame, a second representation of possible proximity of the object to the input panel;
   determine, from a third input frame in which input is received via the at least one detection element, the third input frame being generated after the second input frame, a third representation of possible proximity of the object to the input panel; and
   determine whether proximity of the object to the input panel is detected for the second input frame, at least in part by:
   if the first representation indicates a detection of possible proximity of the object to the input panel for the first input frame, the third representation indicates a detection of possible proximity of the object to the input panel for the third input frame similar to the detection for the first input frame, and the second representation does not indicate a detection of possible proximity of the object to the input panel for the second frame similar to the detection for the first input frame,
   determining that generation of noise or loss of information between input frames caused the second representation to not indicate a detection of possible proximity of the object to the input panel, and
   determining that proximity of the object to the input panel is detected for the second input frame;
   wherein the at least one circuit is further configured to suspend determination of whether proximity of the object to the input panel is detected for the second input frame, when the second representation does not indicate a detection of possible proximity of the object to the input panel for the second frame similar to the detection for the first input frame, until the third representation is compared to the first and/or second representation.

2. The apparatus of claim 1, wherein the at least one circuit is further configured to:
   determine whether proximity of the object to the input panel is detected for the second input frame, based at least in part on the first and second representations, if the first and second representations are similar.

3. The apparatus of claim 1, wherein each of the first, second and third representations comprises, for the respective input frame:
   an indication of whether possible proximity of the object to the input panel is detected; and
   if possible proximity of the object to the input panel is detected, an indication of a position of the detection of possible proximity of the object to the input panel.

4. The apparatus of claim 1, wherein the at least one circuit is configured to determine at least one of the first, second and third representations based at least in part on at least one light-receiving element of the input panel receiving reflected light above a threshold amount.

5. The apparatus of claim 1, wherein the at least one circuit is configured to determine at least one of the first, second and third representations based at least in part on at least one electrical contact made by compression of a portion of the input panel.

6. The apparatus of claim 1, wherein the at least one circuit is configured to determine at least one of the first, second and third representations based at least in part on a change in capacitance of at least one capacitive element of the input panel.

7. The apparatus of claim 1, wherein:
   each of the first and second representations comprises, for the respective input frame, an indication of a position of a detection of possible proximity of the object to the input panel; and
   the at least one circuit is configured to determine whether the first and second representations are similar at least in part by comparing the position indication of the first representation and the position indication of the second representation.

8. The apparatus of claim 7, wherein the at least one circuit is further configured to determine whether the first and second representations are similar at least in part by:
   computing a difference between the position indications of the first and second representations; and comparing the computed difference to a threshold amount.

9. The apparatus of claim 8, wherein the at least one circuit is further configured to determine whether the first and second representations are similar at least in part by:
   if the computed difference is higher than the threshold amount, determining that the first and second representations are not similar; and
   if the computed difference is not higher than the threshold amount, determining that the first and second representations are similar.

10. The apparatus of claim 7, wherein:
   each of the first and second representations further comprises at least one of an area indication, a density indication and an aspect ratio indication for the respective detection of possible proximity of the object to the input panel; and
   the at least one circuit is further configured to determine whether the first and second representations are similar at least in part by comparing the at least one indication of the first representation and the at least one indication of the second representation.

11. The apparatus of claim 10, wherein the at least one circuit is further configured to determine whether the first and second representations are similar at least in part by:
   computing at least one difference between the at least one indication of the first representation and the at least one indication of the second representation;
   computing a combination of the at least one difference and a difference between the position indications of the first and second representations; and
   comparing the computed combination to a threshold amount.

12. The apparatus of claim 11, wherein the at least one circuit is further configured to determine whether the first and second representations are similar at least in part by:
   if the computed combination is higher than the threshold amount, determining that the first and second representations are not similar; and
   if the computed combination is not higher than the threshold amount, determining that the first and second representations are similar.

13. The apparatus of claim 1, wherein the at least one circuit is configured to determine at least one of the first, second and third representations at least in part by:
   identifying a region in the respective input frame corresponding to one or more detection signals received from the input panel;
   determining at least one of an area measure, a density measure and an aspect ratio measure for the identified region; and
   comparing the at least one measure to at least one predetermined range to determine whether possible proximity of the object to the input panel is detected at a position corresponding to the identified region.

14. The apparatus of claim 1, wherein:
   the first representation comprises an indication of a first position of a detection of possible proximity of the object to the input panel for the first input frame; and
   the at least one circuit is configured to:
      determine that the first and second representations are not similar at least in part by determining that the second representation does not indicate a detection of possible proximity of the object to the input panel for the second input frame at a position similar to the first position; and
      determine whether proximity of the object to the input panel is detected for the second input frame at least in part by:
         if the third representation indicates a detection of possible proximity of the object to the input panel for the third input frame at a position similar to the first position, determining that proximity of the object to the input panel is detected for the second input frame.

15. The apparatus of claim 1, wherein:
   the second representation comprises an indication of a first position of a detection of possible proximity of the object to the input panel for the second input frame; and
   the at least one circuit is configured to:
      determine that the first and second representations are not similar at least in part by determining that the first representation does not indicate a detection of possible proximity of the object to the input panel for the first input frame at a position similar to the first position; and
      determine whether proximity of the object to the input panel is detected for the second input frame at least in part by:
         if the third representation does not indicate a detection of possible proximity of the object to the input panel for the third input frame at a position similar to the first position, determining that proximity of the object to the input panel is not detected for the second input frame.

16. The apparatus of claim 15, wherein the at least one circuit is further configured to determine whether proximity of the object to the input panel is detected for the second input frame at least in part by, if the third representation indicates a detection of possible proximity of the object to the input panel for the third input frame at a position similar to the first position:
   determining that proximity of the object to the input panel is detected for the second input frame.

17. The apparatus of claim 16, wherein the at least one circuit is further configured to, if it is determined that proximity of the object to the input panel is detected for the second input frame:
   control a display image associated with the second input frame based at least in part on the indication of the first position.

18. A method for detecting proximity of an object to an input panel, the method comprising:
   determining, from a first input frame in which input is received via the input panel, a first representation of possible proximity of the object to the input panel;
   determining, from a second input frame in which input is received via the input panel, the second input frame being generated after the first input frame, a second representation of possible proximity of the object to the input panel;
   determining, from a third input frame in which input is received via the input panel, the third input frame being generated after the second input frame, a third representation of possible proximity of the object to the input panel;
   determining, using at least one circuit, whether proximity of the object to the input panel is detected for the second input frame, at least in part by:
      if the first representation indicates a detection of possible proximity of the object to the input panel for the first input frame, the third representation indicates a detection of possible proximity of the object to the input panel for the third input frame similar to the detection for the first input frame, and the second representation does not indicate a detection of possible proximity of the object to the input panel for the second frame similar to the detection for the first input frame, determining that generation of noise or loss of information between input frames caused the second representation to not indicate a detection of possible proximity of the object to the input panel, and determining that proximity of the object to the input panel is detected for the second input frame; and suspending determination of whether proximity of the object to the input panel is detected for the second input frame, when the second representation does not indicate a detection of possible proximity of the object to the input panel for the second frame similar to the detection for the first input frame, until the third representation is compared to the first and/or second representation.

19. The method of claim 18, further comprising:
determining whether proximity of the object to the input panel is detected for the second input frame, based at least in part on the first and second representations, if the first and second representations are similar.

20. The method of claim 18, wherein each of the first, second and third representations comprises, for the respective input frame:
an indication of whether possible proximity of the object to the input panel is detected; and
if possible proximity of the object to the input panel is detected, an indication of a position of the detection of possible proximity of the object to the input panel.

21. The method of claim 18, wherein at least one of the first, second and third representations is determined based at least in part on at least one light-receiving element of the input panel receiving reflected light above a threshold amount.

22. The method of claim 18, wherein at least one of the first, second and third representations is determined based at least in part on at least one electrical contact made by compression of a portion of the input panel.

23. The method of claim 18, wherein at least one of the first, second and third representations is determined based at least in part on a change in capacitance of at least one capacitive element of the input panel.

24. The method of claim 18, wherein:
each of the first and second representations comprises, for the respective input frame, an indication of a position of a detection of possible proximity of the object to the input panel; and
the method further comprises determining whether the first and second representations are similar, at least in part by comparing the position indication of the first representation and the position indication of the second representation.

25. The method of claim 24, wherein determining whether the first and second representations are similar comprises:
computing a difference between the position indications of the first and second representations; and
comparing the computed difference to a threshold amount.

26. The method of claim 25, wherein determining whether the first and second representations are similar further comprises:
if the computed difference is higher than the threshold amount, determining that the first and second representations are not similar; and
if the computed difference is not higher than the threshold amount, determining that the first and second representations are similar.

27. The method of claim 24, wherein:
each of the first and second representations further comprises at least one of an area indication, a density indication and an aspect ratio indication for the respective detection of possible proximity of the object to the input panel; and
determining whether the first and second representations are similar further comprises comparing the at least one indication of the first representation and the at least one indication of the second representation.

28. The method of claim 27, wherein determining whether the first and second representations are similar comprises:
computing at least one difference between the at least one indication of the first representation and the at least one indication of the second representation;
computing a combination of the at least one difference and a difference between the position indications of the first and second representations; and
comparing the computed combination to a threshold amount.

29. The method of claim 28, wherein determining whether the first and second representations are similar further comprises:
if the computed combination is higher than the threshold amount, determining that the first and second representations are not similar; and
if the computed combination is not higher than the threshold amount, determining that the first and second representations are similar.

30. The method of claim 18, wherein determining at least one of the first, second and third representations comprises:
identifying a region in the respective input frame corresponding to one or more detection signals received from one or more detection elements of the input panel;
determining at least one of an area measure, a density measure and an aspect ratio measure for the identified region; and
comparing the at least one measure to at least one predetermined range to determine whether possible proximity of the object to the input panel is detected at a position corresponding to the identified region.

31. The method of claim 18, wherein:
the first representation comprises an indication of a first position of a detection of possible proximity of the object to the input panel for the first input frame;
the method further comprises determining that the first and second representations are not similar, at least in part by determining that the second representation does not indicate a detection of possible proximity of the object to the input panel for the second input frame at a position similar to the first position; and
determining whether proximity of the object to the input panel is detected for the second input frame comprises:
if the third representation indicates a detection of possible proximity of the object to the input panel for the third input frame at a position similar to the first position, determining that proximity of the object to the input panel is detected for the second input frame.

32. The method of claim 18, wherein:
the second representation comprises an indication of a first position of a detection of possible proximity of the object to the input panel for the second input frame;
the method further comprises determining that the first and second representations are not similar, at least in part by determining that the first representation does not indicate a detection of possible proximity of the object to the input panel for the first input frame at a position similar to the first position; and determining whether proximity of the object to the input panel is detected for the second input frame comprises:
if the third representation does not indicate a detection of possible proximity of the object to the input panel for the third input frame at a position similar to the first position, determining that proximity of the object to the input panel is not detected for the second input frame.

33. The method of claim 32, wherein determining whether proximity of the object to the input panel is detected for the second input frame further comprises, if the third representation indicates a detection of possible proximity of the object to the input panel for the third input frame at a position similar to the first position:
determining that proximity of the object to the input panel is detected for the second input frame.

34. The method of claim 33, further comprising, if it is determined that proximity of the object to the input panel is detected for the second input frame:
controlling a display image associated with the second input frame based at least in part on the indication of the first position.

35. At least one non-transitory computer-readable storage medium encoded with a plurality of computer-executable instructions that, when executed, perform a method for detecting proximity of an object to an input panel, the method comprising:
determining, from a first input frame in which input is received via the input panel, a first representation of possible proximity of the object to the input panel;
determining, from a second input frame in which input is received via the input panel, the second input frame being generated after the first input frame, a second representation of possible proximity of the object to the input panel;
determining, from a third input frame in which input is received via the input panel, the third input frame being generated after the second input frame, a third representation of possible proximity of the object to the input panel; and
determining whether proximity of the object to the input panel is detected for the second input frame, at least in part by:
if the first representation indicates a detection of possible proximity of the object to the input panel for the first input frame, the third representation indicates a detection of possible proximity of the object to the input panel for the third input frame similar to the detection for the first input frame, and the second representation does not indicate a detection of possible proximity of the object to the input panel for the second frame similar to the detection for the first input frame,
determining that generation of noise or loss of information between input frames caused the second representation to not indicate a detection of possible proximity of the object to the input panel, and
determining that proximity of the object to the input panel is detected for the second input frame;
wherein the method further comprises suspending determination of whether proximity of the object to the input panel is detected for the second input frame, when the second representation does not indicate a detection of possible proximity of the object to the input panel for the second frame similar to the detection for the first input frame, until the third representation is compared to the first and/or second representation.

* * * * *